(12) United States Patent
Trotta et al.

(10) Patent No.: US 11,164,482 B2
(45) Date of Patent: Nov. 2, 2021

(54) HUMAN TISSUE MODELS, MATERIALS, AND METHODS

(71) Applicant: Gaumard Scientific Company, Inc., Miami, FL (US)

(72) Inventors: Thomas Neil Trotta, Marco Island, FL (US); Jennifer Anne Trotta, Marcho Island, FL (US); Siobhain Lowe, Miami, FL (US)

(73) Assignee: Gaumard Scientific Company, Inc., Miami, FL (US)

( * ) Notice: Subject to any disclaimer, the term of this patent is extended or adjusted under 35 U.S.C. 154(b) by 0 days.

(21) Appl. No.: 16/564,084

(22) Filed: Sep. 9, 2019

(65) Prior Publication Data

US 2020/0005678 A1 Jan. 2, 2020

Related U.S. Application Data

(63) Continuation of application No. 15/294,991, filed on Oct. 17, 2016, now Pat. No. 10,438,510, which is a continuation of application No. 13/750,842, filed on Jan. 25, 2013, now Pat. No. 9,472,123.

(60) Provisional application No. 61/591,748, filed on Jan. 27, 2012.

(51) Int. Cl.
| G09B 23/30 | (2006.01) |
| G09B 23/34 | (2006.01) |
| B29C 39/02 | (2006.01) |
| B29C 39/10 | (2006.01) |
| B29C 39/12 | (2006.01) |

(52) U.S. Cl.
CPC ............ *G09B 23/30* (2013.01); *B29C 39/021* (2013.01); *B29C 39/025* (2013.01); *B29C 39/10* (2013.01); *B29C 39/123* (2013.01); *G09B 23/34* (2013.01)

(58) Field of Classification Search
CPC .... G09B 23/28; G09B 23/281; G09B 23/285; G09B 23/30; G09B 23/34
See application file for complete search history.

(56) References Cited

U.S. PATENT DOCUMENTS

| 4,195,420 | A | | 4/1980 | Fields |
| 4,277,367 | A | | 7/1981 | Madsen et al. |
| 4,481,001 | A | * | 11/1984 | Graham ............... G09B 23/285 434/267 |
| 4,789,340 | A | | 12/1988 | Zikria |
| 5,104,328 | A | | 4/1992 | Lounsbury |
| 5,308,277 | A | * | 5/1994 | Nielsen ................ G09B 23/281 434/273 |
| 5,472,345 | A | | 12/1995 | Eggert |
| 5,775,916 | A | | 7/1998 | Cooper |
| 5,805,665 | A | | 9/1998 | Nelson et al. |
| 5,853,292 | A | | 12/1998 | Eggert et al. |
| 5,855,586 | A | | 1/1999 | Habara et al. |
| 5,902,748 | A | | 5/1999 | Madsen et al. |
| 6,193,519 | B1 | | 2/2001 | Eggert et al. |
| 6,443,735 | B1 | | 9/2002 | Eggert et al. |

(Continued)

*Primary Examiner* — Kurt Fernstrom
(74) *Attorney, Agent, or Firm* — Haynes and Boone, LLP

(57) ABSTRACT

Devices, systems, and methods appropriate for use in medical training that include materials that better mimic natural human tissue are disclosed. In one aspect, multi-layer tissue simulations are provided. In another aspect, male genitalia models are provided. In another aspect, abdominal surgical wall inserts are provided. Systems and methods associated with these devices are also provided.

18 Claims, 25 Drawing Sheets

(56) References Cited

U.S. PATENT DOCUMENTS

| | | |
|---|---|---|
| 6,503,087 B1 | 1/2003 | Eggert et al. |
| 6,527,558 B1 | 3/2003 | Eggert et al. |
| 6,675,035 B1 | 1/2004 | Grable et al. |
| 6,758,676 B2 | 7/2004 | Eggert et al. |
| 6,780,016 B1 * | 8/2004 | Toly .................. G09B 23/285 434/262 |
| 6,945,783 B2 | 9/2005 | Weissman et al. |
| 7,114,954 B2 | 10/2006 | Eggert et al. |
| 7,192,284 B2 | 3/2007 | Eggert et al. |
| 7,544,062 B1 | 6/2009 | Hauschild et al. |
| 7,811,090 B2 | 10/2010 | Eggert et al. |
| 7,866,983 B2 | 1/2011 | Hemphill et al. |
| 7,976,312 B2 | 7/2011 | Eggert et al. |
| 7,976,313 B2 | 7/2011 | Eggert et al. |
| 8,016,598 B2 | 9/2011 | Eggert et al. |
| 8,152,532 B2 | 4/2012 | Eggert et al. |
| 8,403,675 B2 * | 3/2013 | Stoianovici ............ G09B 23/28 434/262 |
| 8,419,438 B2 | 4/2013 | Eggert et al. |
| 8,500,452 B2 | 8/2013 | Trotta et al. |
| 8,517,740 B2 | 8/2013 | Trona et al. |
| 8,608,483 B2 | 12/2013 | Trotta et al. |
| 8,678,831 B2 | 3/2014 | Trotta et al. |
| 8,696,362 B2 | 4/2014 | Eggert et al. |
| 8,740,624 B2 | 6/2014 | Eggert et al. |
| 9,123,261 B2 * | 9/2015 | Lowe .................. G09B 23/288 |
| 9,275,557 B2 | 3/2016 | Trotta et al. |
| 9,437,117 B2 * | 9/2016 | Carvajal ............... G09B 23/32 |
| 2004/0126746 A1 | 7/2004 | Toly |
| 2005/0026125 A1 | 2/2005 | Toly |
| 2005/0214727 A1 | 9/2005 | Stoianovici et al. |
| 2005/0227364 A1 | 10/2005 | Madsen et al. |
| 2008/0076099 A1 | 3/2008 | Sarvazyan |
| 2008/0114460 A1 | 5/2008 | Willobee et al. |
| 2008/0138781 A1 | 6/2008 | Pellegrin et al. |
| 2009/0148822 A1 | 6/2009 | Eggert |
| 2009/0246747 A1 | 10/2009 | Buckman, Jr. |
| 2010/0167254 A1 | 7/2010 | Nguyen |
| 2010/0209899 A1 | 8/2010 | Park |
| 2011/0062318 A1 | 3/2011 | Bisaillon et al. |
| 2011/0091855 A1 | 4/2011 | Miyazaki |
| 2011/0207102 A1 * | 8/2011 | Trotta .................. G09B 23/28 434/267 |
| 2011/0207103 A1 | 8/2011 | Trona Thomas Neil |
| 2012/0015337 A1 | 1/2012 | Hendrickson et al. |
| 2012/0082970 A1 * | 4/2012 | Pravong ............... G09B 23/34 434/262 |
| 2012/0148994 A1 * | 6/2012 | Hori .................... G09B 23/30 434/272 |
| 2012/0164616 A1 * | 6/2012 | Endo .................. G09B 23/285 434/267 |
| 2014/0162232 A1 * | 6/2014 | Yang ................... G09B 23/34 434/267 |
| 2018/0301064 A1 * | 10/2018 | Hofstetter ........... G09B 23/285 |

* cited by examiner

US 11,164,482 B2

HUMAN TISSUE MODELS, MATERIALS, AND METHODS

CROSS-REFERENCE TO RELATED APPLICATIONS

The present application is a continuation of U.S. patent application Ser. No. 15/294,991, filed Oct. 17, 2016, which is a continuation of U.S. patent application Ser. No. 13/750,842, filed Jan. 25, 2013, now U.S. Pat. No. 9,472,123, which claims priority to, and the benefit of the filing date of, U.S. Provisional Patent Application No. 61/591,748, filed on Jan. 27, 2012, the entire disclosures of which are hereby incorporated by reference.

BACKGROUND

As medical science has progressed, it has become increasingly important to provide non-human interactive formats for teaching patient care. Non-human interactive devices and systems can be used to teach the skills needed to successfully identify and treat various patient conditions without putting actual patients at risk. Such training devices and systems can be used by medical personnel and medical students to learn the techniques required for proper patient care. The training devices and systems can also be used by patients to learn the proper way to perform self-examinations.

As the use of non-human interactive training formats has increased, the need for materials that simulate natural human tissue has also increased. There have been earlier attempts to mimic characteristics of natural human tissues. For example, U.S. Patent Application Publication No. 2008/0076099 discloses human tissue phantoms and associated methods of manufacturing that utilize two-component silicone gels covered by a nylon fabric. Also, U.S. Pat. Nos. 5,805,665, 4,277,367, 5,902,748, and 6,675,035 each disclose various materials intended to simulate imaging properties of human tissue for various types of imaging techniques. Further, U.S. Pat. No. 6,945,783 discloses a breast examination training system with inflatable nodules that simulate tumors within the breast tissue. While these earlier attempts at mimicking aspects of natural human tissue have been adequate in some respects, they have been inadequate in many respects. Accordingly, there remains a need for materials that better mimic natural human tissue. In that regard, the training of medical personnel and patients is greatly enhanced through the use of realistic hands-on training with devices and systems, such as those of the present disclosure, that better mimic characteristics of natural human tissue than previous materials.

In view of the foregoing, there remains a need for devices, systems, and methods appropriate for use in medical training that include materials that mimic natural human tissue.

BRIEF DESCRIPTION OF THE DRAWINGS

The present disclosure can be better understood from the following detailed description when read with the accompanying figures.

DETAILED DESCRIPTION OF PREFERRED EMBODIMENTS

Figure 1:
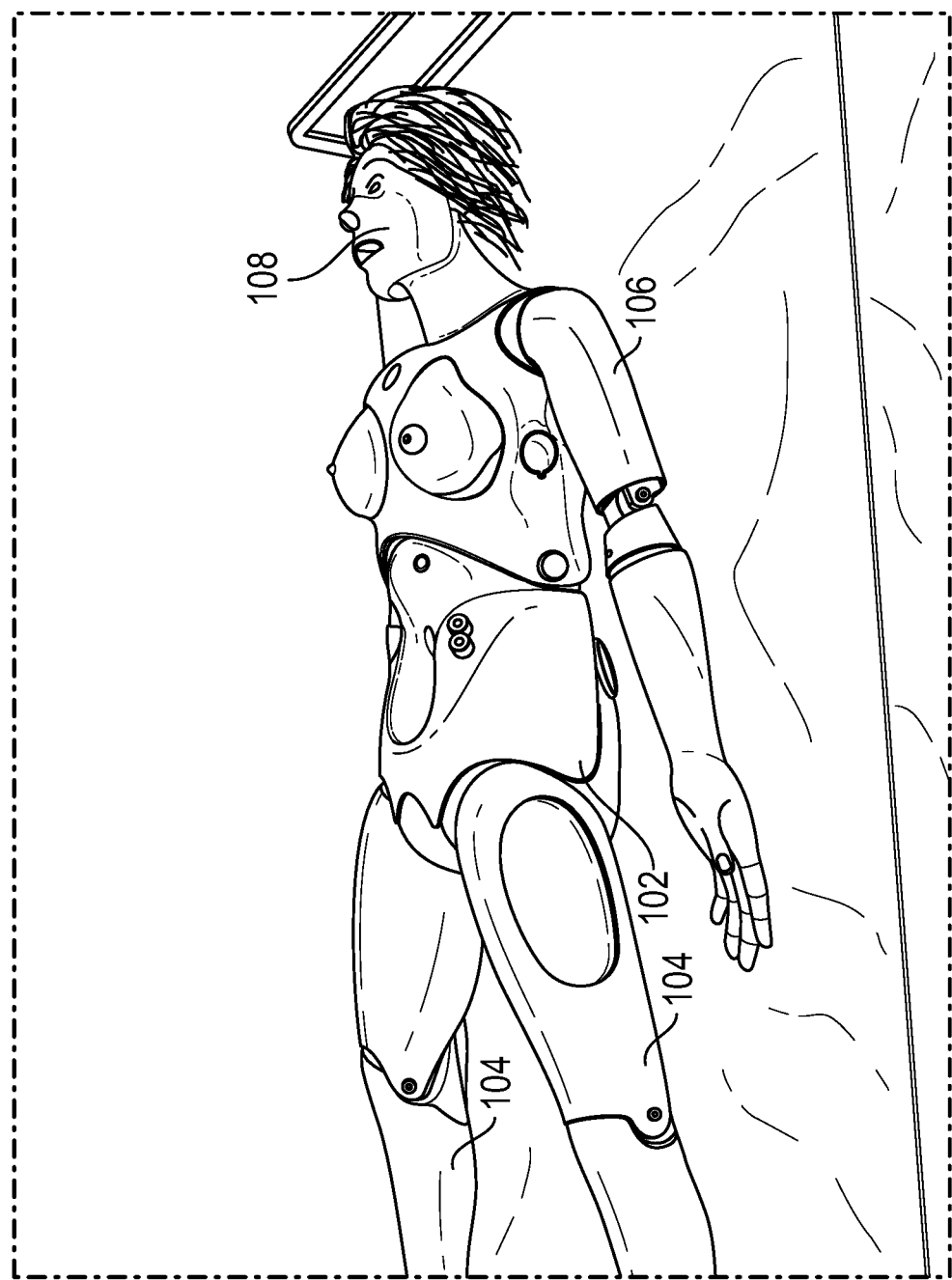
FIG. 1 is a perspective view of a patient simulator according to one aspect of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Referring initially to FIG. 1, shown therein is a patient simulator 100. In the illustrated embodiment, the patient simulator 100 is a full body patient simulator. To that end, the patient simulator 100 includes a torso 102, legs 104, arms 106, and a head 108. The various anatomical portions of the patient simulator 100 are sized, shaped, and formed of a suitable material to mimic natural human anatomy. The patient simulator 100 can be either a male simulator or a female simulator and will include appropriate anatomical features based on the simulated gender. Further, in some instances, the patient simulator 100 includes a simulated circulatory system, a simulated respiratory system, and/or other simulated aspects. In that regard, the patient simulator 100 is in communication with a control system configured to control the circulatory system, respiratory system, and/or other aspects of the patient simulator. For example, in some instances, the control system is configured to adjust parameters associated with the circulatory system, respiratory system, and/or other aspects of the patient simulator 100 in accordance with a simulation scenario and/or a user's application of treatment to the patient simulator 100 based on the simulation scenario.

Accordingly, in some instances, the patient simulator 100 includes one or more features as described in U.S. patent application Ser. No. 13/223,020, filed Aug. 31, 2011, now U.S. Pat. No. 8,419,438, U.S. patent application Ser. No. 13/031,116, filed Feb. 18, 2011, now U.S. Pat. No. 8,517,740, U.S. patent application Ser. No. 13/031,087, filed Feb. 18, 2011, now U.S. Pat. No. 8,678,831, U.S. patent application Ser. No. 13/031,102, filed Feb. 18, 2011, now U.S. Pat. No. 8,608,483, U.S. patent application Ser. No. 12/856,903, filed Aug. 16, 2010, now U.S. Pat. No. 8,152,532, U.S. patent application Ser. No. 12/708,682, filed Feb. 19, 2010, now U.S. Pat. No. 8,740,624, U.S. patent application Ser. No. 12/708,659, filed Feb. 19, 2010, now U.S. Pat. No. 8,500,452, U.S. patent application Ser. No. 11/952,606, filed Dec. 7, 2007, now U.S. Pat. No. 8,696,362, U.S. patent application Ser. No. 11/952,669, filed Dec. 7, 2007, now U.S. Publication No. 2009-0148822, U.S. Pat. Nos. 8,016,598, 7,976,313, 7,976,312, 7,866,983, 7,114,954, 7,192,284, 7,811,090, 6,758,676, 6,503,087, 6,527,558, 6,443,735, 6,193,519, and 5,853,292, and 5,472,345, each of which is hereby incorporated by reference in its entirety.

Further, in some instances, the patient simulator 100 includes one or more features as provided in medical simulators provided by Gaumard Scientific Company, Inc. based out of Miami, Fla., including but not limited to the following models: S1000 Hal®, S1020 Hal®, S1030 Hal®, S3000 Hal®, S2000 Susie®, S221 Clinical Chloe, S222 Clinical Chloe, S222.100 Super Chloe, S303 Code Blue®, S304 Code Blue®, S100 Susie®, S100 Simon®, S200 Susie®, S200 Simon®, S201 Susie®, S201 Simon®, S203 Susie®, S204 Simon®, S205 Simple Simon®, S206 Simple Susie®, S3004 Pediatric Hal®, S3005 Pediatric Hal®, S3009 Premie Hal®, S3010 Newborn Hal®, S110 Mike®, S110 Michelle®, S150 Mike®, S150 Michelle®, S107 Multipurpose Patient Care and CPR Infant Simulator, S117 Multipurpose Patient Care and CPR Pediatric Simulator, S157 Multipurpose Patient Care and CPR Pediatric Simulator, S575 Noelle®, S565 Noelle®, S560 Noelle®, S555 Noelle®, S550 Noelle®, S550.100 Noelle, and/or other patient simulators.

Figure 2:
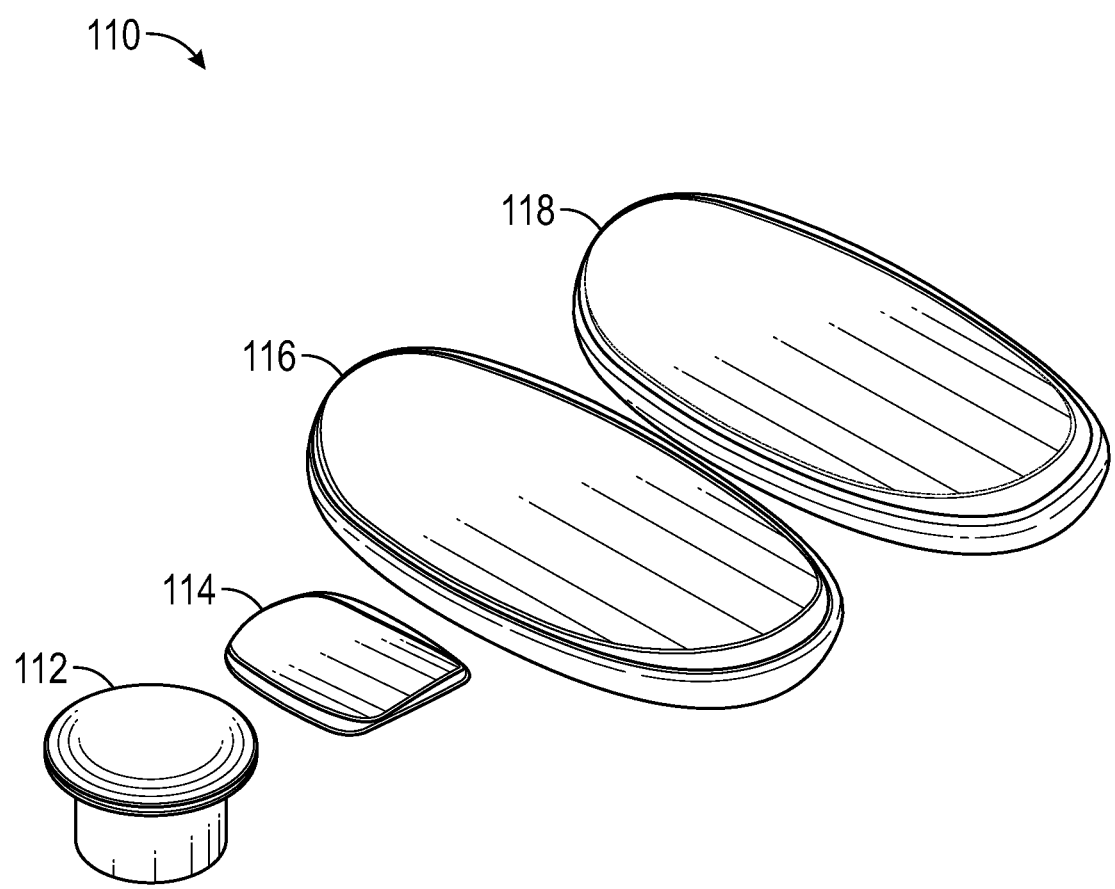
FIG. 2 is a perspective view of a plurality of tissue inserts for use with the patient simulator of FIG. 1 according to various aspects of the present disclosure.

Referring now to FIG. 2, shown therein is a set 110 of multi-layer tissue constructs suitable for use with the patient simulator 100. In particular, a gluteus tissue insert 112, a deltoid tissue insert 114, a thigh tissue insert 116, and a thigh tissue insert 118 are shown. However, it will be apparent from the following description that similar tissue inserts can be created for virtually any portion of the human body that includes a skin layer. As will be discussed below, the multi-layer tissue constructs described herein provide injection and surgical inserts that can be used with existing manikins and/or incorporated into new manikins. The inserts provide a closer approximation to the human anatomy they represent by appropriately replicating the various natural tissue layers associated with such anatomy including, for example, skin, subcutaneous, fascia, and muscle, to provide a realistic model on which injection and surgical techniques can be taught. In that regard, the multi-layer tissue models of the present disclosure aims to provide a more accurate representation of the tissue layers involved in subcutaneous injection, intramuscular injection, surgical techniques, wound closure techniques, and dermal suture removal. By providing anatomically relevant layers, familiarity with needle, scalpel, and suture techniques can be achieved in a system that provides realistic tactile feedback. These skills can be obtained in a stress-free environment so that a medical practitioner is adequately trained prior to work on a live patient.

Figure 3:
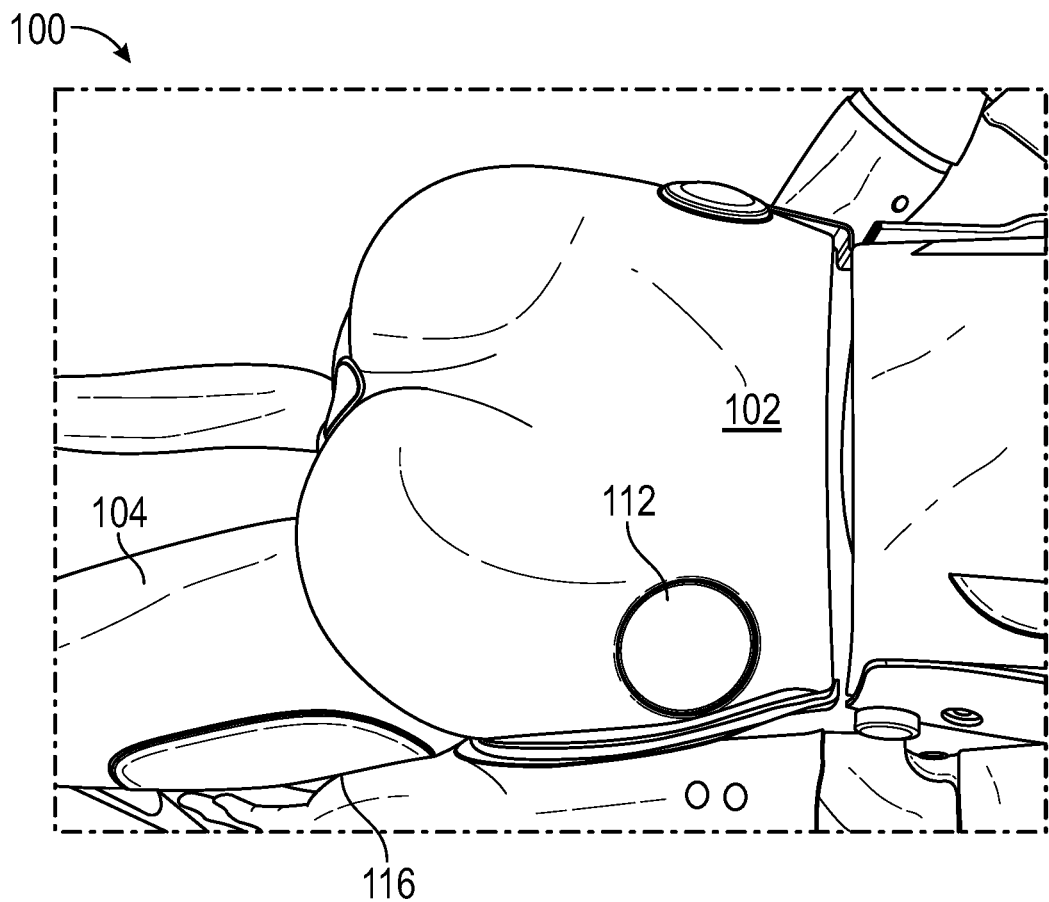
FIG. 3 is a perspective view of a portion of the patient simulator of FIG. 1 illustrating a gluteus tissue insert according to one aspect of the present disclosure.
Figure 4:
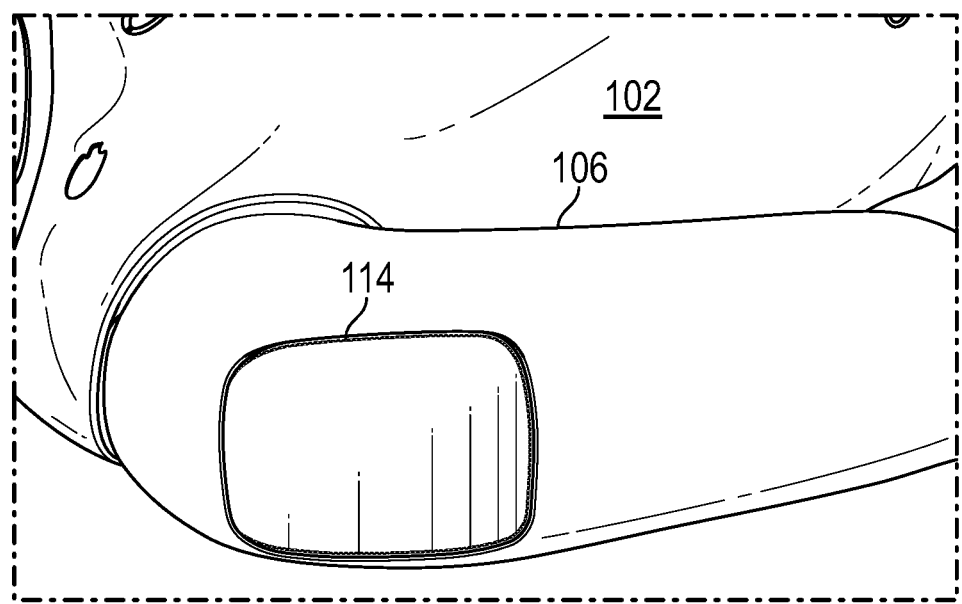
FIG. 4 a perspective view of a portion of the patient simulator of FIG. 1 illustrating a deltoid tissue insert according to one aspect of the present disclosure.
Figure 6:
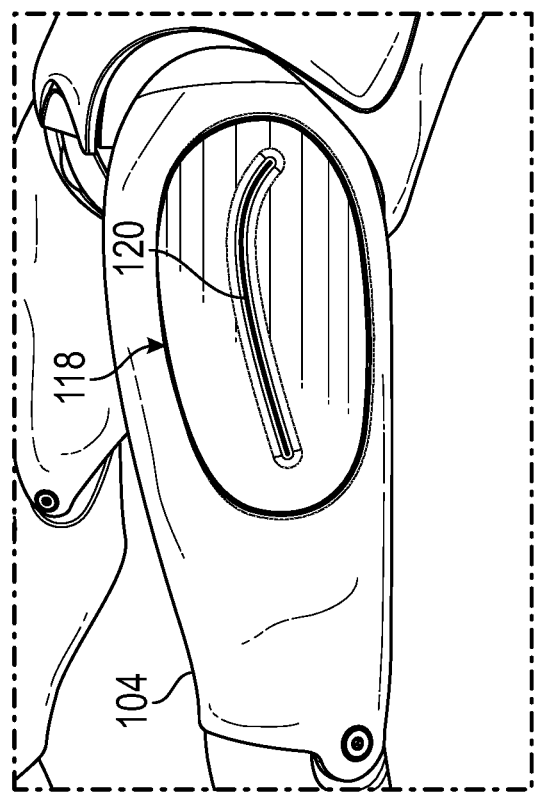
FIG. 6 is a perspective view of a portion of the patient simulator of FIG. 1 illustrating a thigh tissue insert similar to that of FIG. 5, but according to another aspect of the present disclosure.
Figure 5:
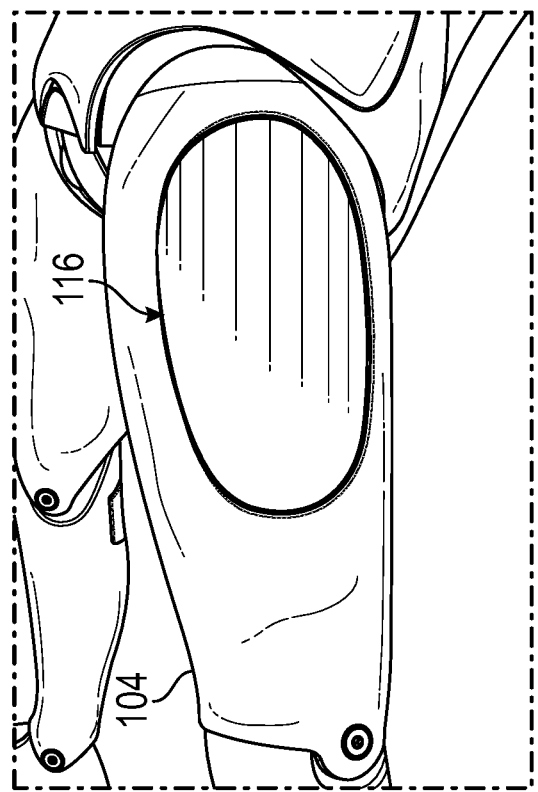
FIG. 5 is a perspective view of a portion of the patient simulator of FIG. 1 illustrating a thigh tissue insert according to one aspect of the present disclosure.
Figure 7:
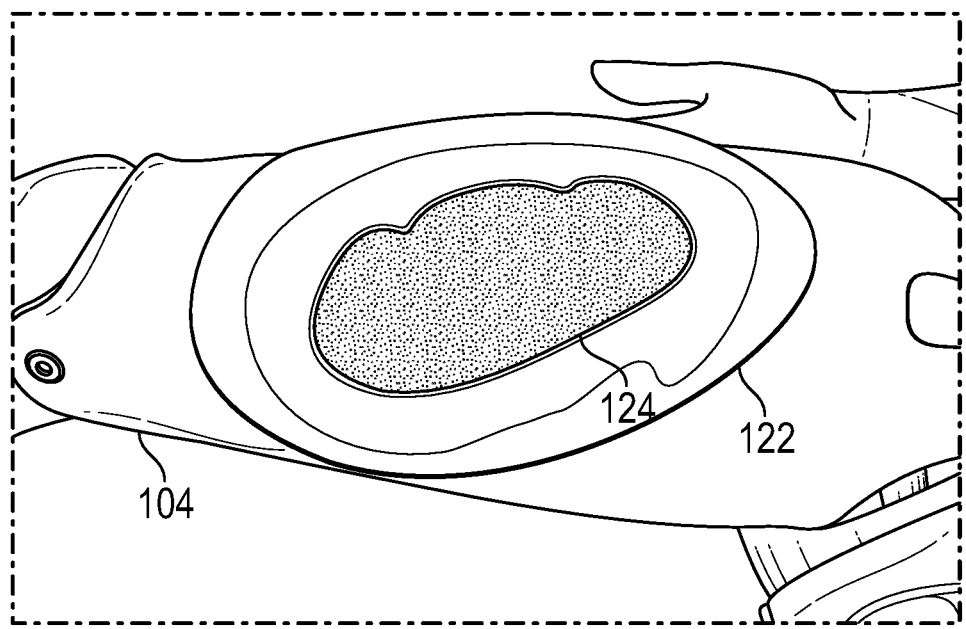
FIG. 7 is a perspective view of a portion of the patient simulator of FIG. 1 illustrating a thigh tissue insert similar to that of FIGS. 5 and 6, but according to yet another aspect of the present disclosure.
Figure 8:
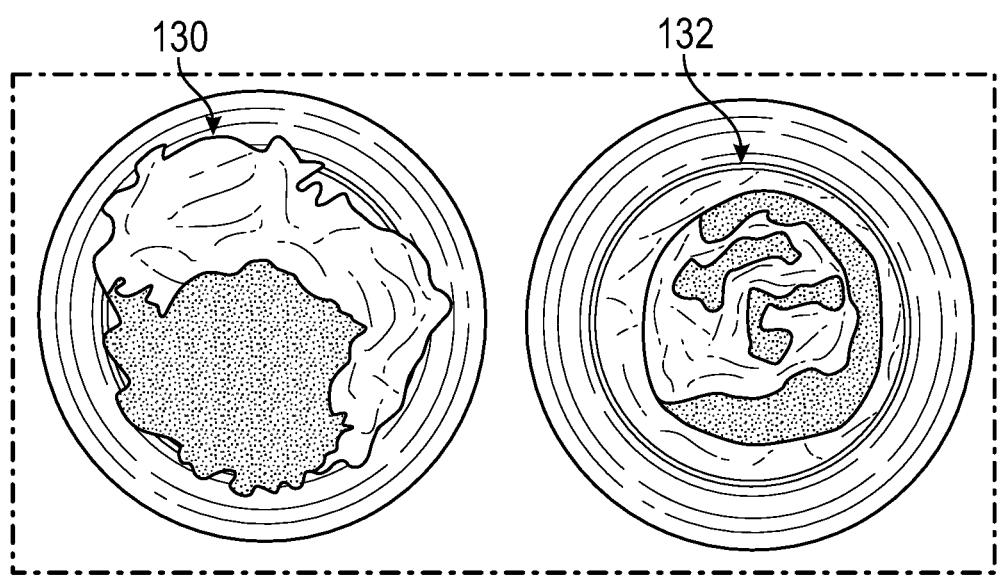
FIG. 8 is a top view of a pair of tissue inserts illustrating additional aspects of the present disclosure.

As noted above, the inserts shown in FIG. 2 are configured for the thigh, deltoid, and gluteus regions, but the applicable tissue region can be expanded to include any region of the body where the skin, subcutaneous, fascia, and/or muscle layers need to be represented. In that regard, such tissue inserts are suitable for training a variety of medical procedures across the body, including, but not limited to, insertion of chest drains, tension pneumothorax cut-down sites, and spine injection simulators. Further, as will be discussed in greater detail below, the tissue inserts include various types of wounds, including open wounds for training of treatment of open wounds, partially healed suture lines that can be used for training of suture removal techniques, and/or other wound variations Each of the multi-layer tissue inserts is manufactured to accurately conform to existing manikin geometry. In that regard, the insert is typically sized and shaped to be received within an opening of the manikin at an appropriate anatomical location. Further, when seated within the opening and secured to the manikin, the outer surface of the tissue insert (e.g., the skin layer) is typically flush with the surrounding outer layer of the manikin such that the insert provides an approximate continuation of the natural outer surface of the manikin. In that regard, FIGS. 3-6 each illustrate the positioning of a tissue insert within the manikin. In particular, FIG. 3 shows the gluteus tissue insert 112 and the thigh insert 116 positioned within corresponding portions of the patient simulator 100. FIG. 4 illustrates the deltoid insert 114 positioned within the arm 106 of the patient simulator 100. FIG. 5 illustrates the thigh insert 116 positioned within the leg 104 of the patient simulator 100. FIG. 6 illustrates the thigh insert 118 positioned within the leg 104 of the patient simulator 100. The thigh insert 118 includes a partially healed suture line 120. FIGS. 7 and 8 illustrate alternative wounds that can be included on any of the tissue inserts of the present disclosure. In that regard, FIG. 7 shows a thigh insert 122 having an open wound 124 formed thereon. FIG. 8 shows a tissue insert 130 simulating an initial stage of ulceration for a decubitus ulcer and a tissue insert 132 simulating a deeply infected stage of ulceration of a decubitus ulcer.

Note, generally, how the inserts fit into the recesses or openings in the patient simulator 100, thereby allowing training procedures to be carried out in situ. In that regard, the insert pads can be used for various procedures including: subcutaneous injection, intramuscular injection, surgical techniques, and/or wound closure techniques. Further, since the inserts are easily replaceable, multiple training procedures can be performed using the same patient simulator 100 by simply exchanging a used insert for a new insert. Further still, in many instances the inserts are suitable for use in multiple training procedures, such that a single insert can be used to train many users before needing replacement.

Figure 9:
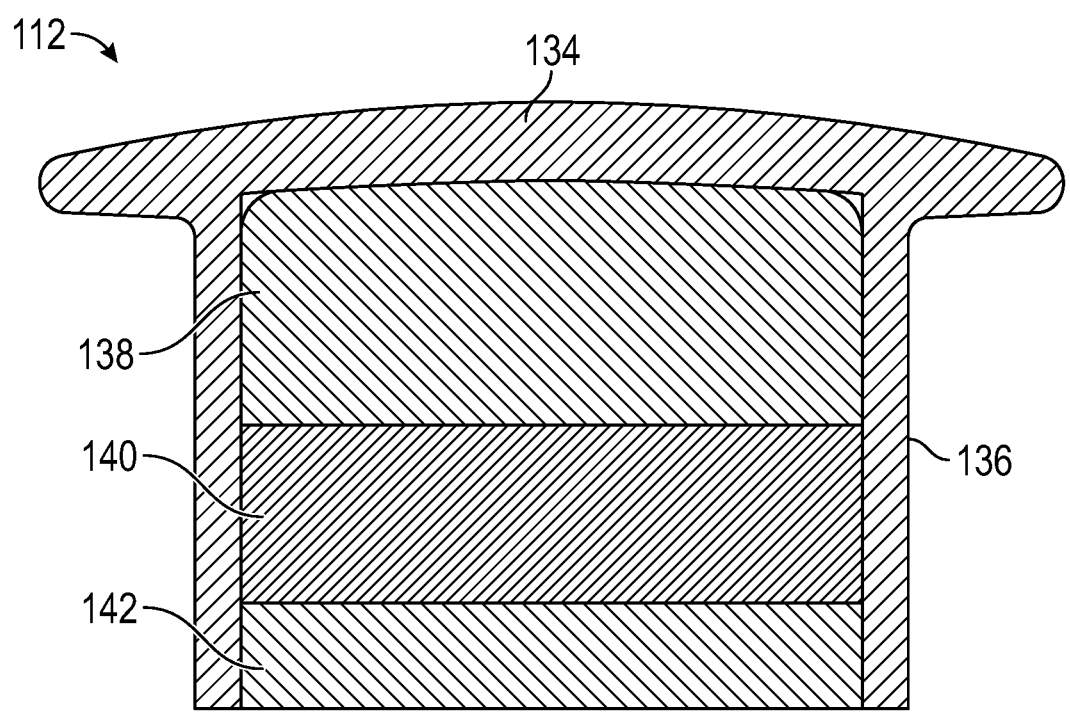
FIG. 9 is a diagrammatic cross-sectional side view of a tissue insert according to an aspect of the present disclosure.

Generally, the tissue inserts 112, 114, 116, 118, and 122 have a similar layered structure, but relative thicknesses of the layers and the size and shape of the insert are adjusted to properly simulate the desired anatomical feature. Generally, the tissue inserts of the present disclosure consist of four to five layers, namely the skin, subcutaneous, fascia, muscle, and a backing. In some instances, the muscle layer and the backing are integrally formed of the same material such that muscle and backing may be considered to be a single layer. For sake of clarity, the layered structure of the tissue inserts 112, 114, 116, 118, and 122 will be described in relation to the gluteus insert 112 illustrated in FIG. 9. As shown, the gluteus insert 112 includes a skin layer 134. In the illustrated embodiment, a cylindrical wall 136 extends from the skin layer 134. In some instances, the wall 136 is integrally formed with the skin layer 134 and defines a cavity for forming the remaining layers of the insert 112. In the illustrated embodiment, a subcutaneous layer 138 is formed adjacent the skin layer 134 within the cavity defined by wall 136. A fascia layer 140 is formed adjacent the subcutaneous layer 138. A muscle layer 142 is formed adjacent to the fascia layer 140. In the illustrated embodiment, the muscle layer 142 also forms the backing of the insert 112. Accordingly, a separate backing layer is not illustrated. However, in other embodiments, a backing layer separate from the muscle layer 142 is included.

Dependent on the particular location on the body that the insert represents, the respective thickness of the above-mentioned layers is adjusted to create a realistic model. Further, each layer is pigmented according to the anatomical tissue layer it represents. The layers are formed from materials having appropriate mechanical properties such that when injecting needle into the insert, there is a distinct difference when the needle has passed through the skin layer 134 into the subcutaneous layer 138, and then again when it passes into the muscle layer 142. Generally, the resistance decreases when passing through the skin layer 134 to the subcutaneous and fascia layers 138, 140 and then increases when the needle reaches the muscle layer 142. In that regard, the resistance of the muscle layer 142 is greater than that of the skin layer 134. Table 1 provides an exemplary range of skin and subcutaneous layer thicknesses for the thigh, gluteus, and deltoid regions, and an exemplary specific thickness adopted for the inserts shown in FIG. 2 above.

TABLE 1

Exemplary skin and subcutaneous layer thicknesses for gluteus, deltoid, and thigh tissue inserts. All measurements in millimeters.

| | Gluteus | | Deltoid | | Thigh | |
|---|---|---|---|---|---|---|
| | Skin | Subcutaneous | Skin | Subcutaneous | Skin | Subcutaneous |
| Mean - 3SD | 0.97 | N/A | 0.91 | N/A | 0.7 | N/A |
| Mean | 2.41 | 15.45 | 2.23 | 10.77 | 1.87 | 10.35 |
| Mean + 3SD | 3.85 | 37.26 | 3.55 | 27.63 | 3.04 | 27.3 |
| Model | 3.5 | 16.0 | 3.0 | 10.0 | 3.0 | 11.0 |

In some instances, the tissue inserts of the present disclosure are manufactured in a mold that includes a two-component cavity mold, a core, and a bridge. The shapes of the mold components have varying degrees of complexity based on the tissue model being manufactured. In some instances, the mold components are formed of machined aluminum 6061 that are designed in a 3D CAD system such as SolidWorks or Rapidform, and have a matte surface finish that is obtained by bead blasting. Most tissue models include undercuts, so a split cavity mold is required to allow machining of the mold components and to improve de-molding. Aluminum 6061 was selected as a mold material due to the fact that it is light-weight and has superior heat transfer properties for those steps that require cure at elevated temperatures. However, any other suitable mold materials may be utilized as would be recognized by those skilled in the art. Further, the cores are typically designed to ensure a constant thickness of the skin layer, which is continuous with the side walls. However, in some circumstances, the core may be shaped to provide a varying thickness to the skin layer and/or the sidewalls of the tissue insert.

Figure 10:
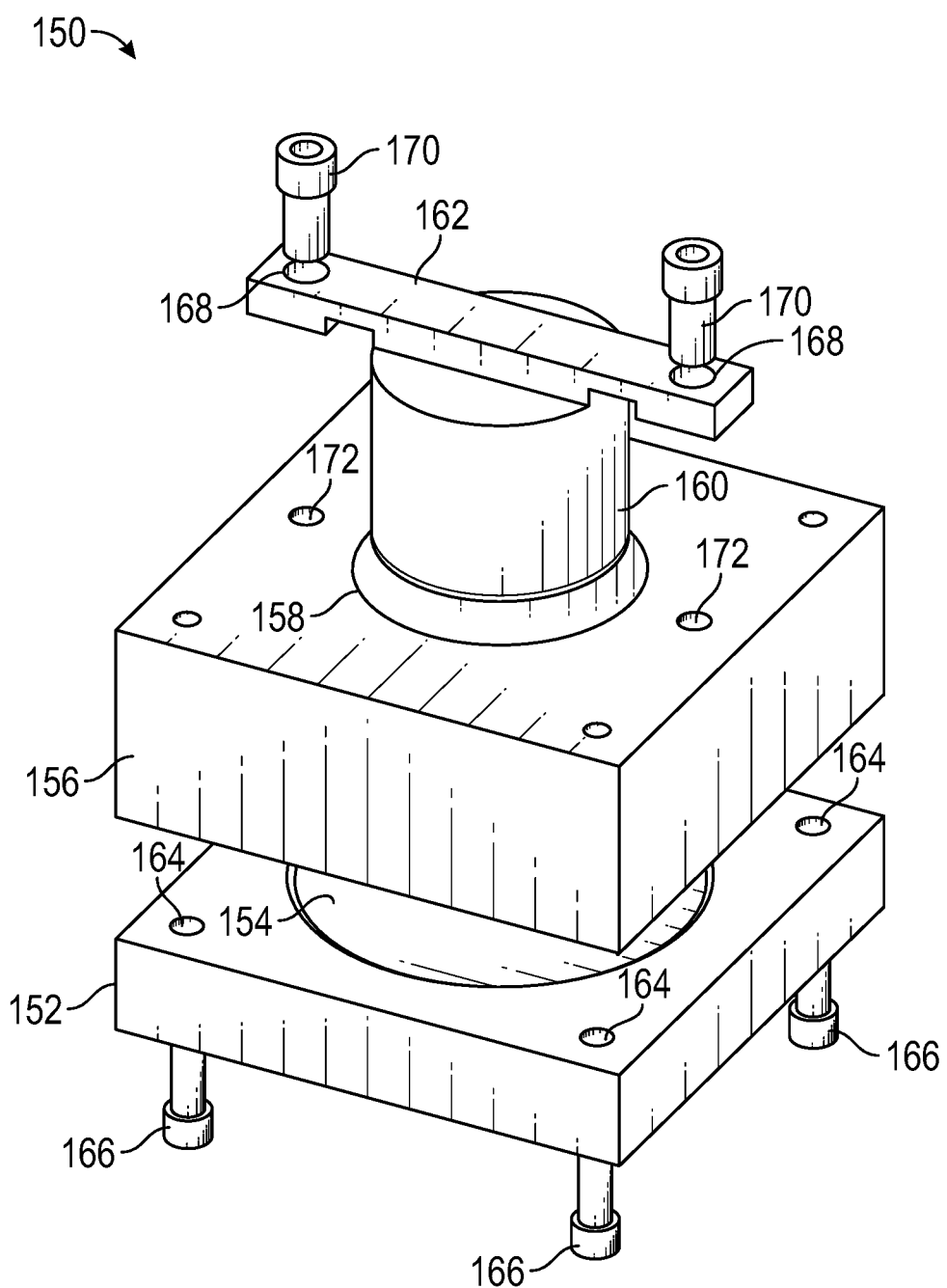
FIG. 10 is a perspective, exploded view of a molding system configured to produce the tissue insert of FIG. 9 according to an embodiment of the present disclosure.
Figure 11:
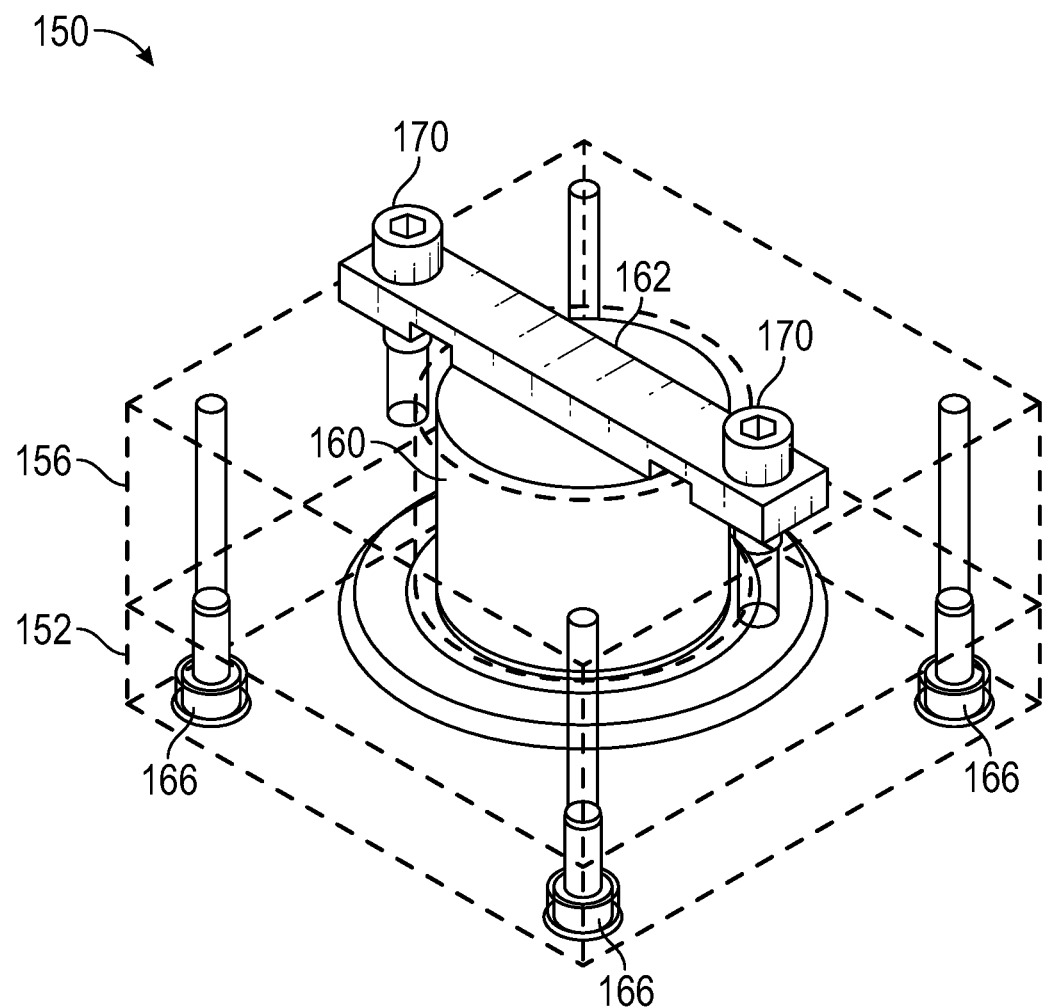
FIG. 11 is a perspective, assembled, partially translucent view of the molding system of FIG. 10.
Figure 12:
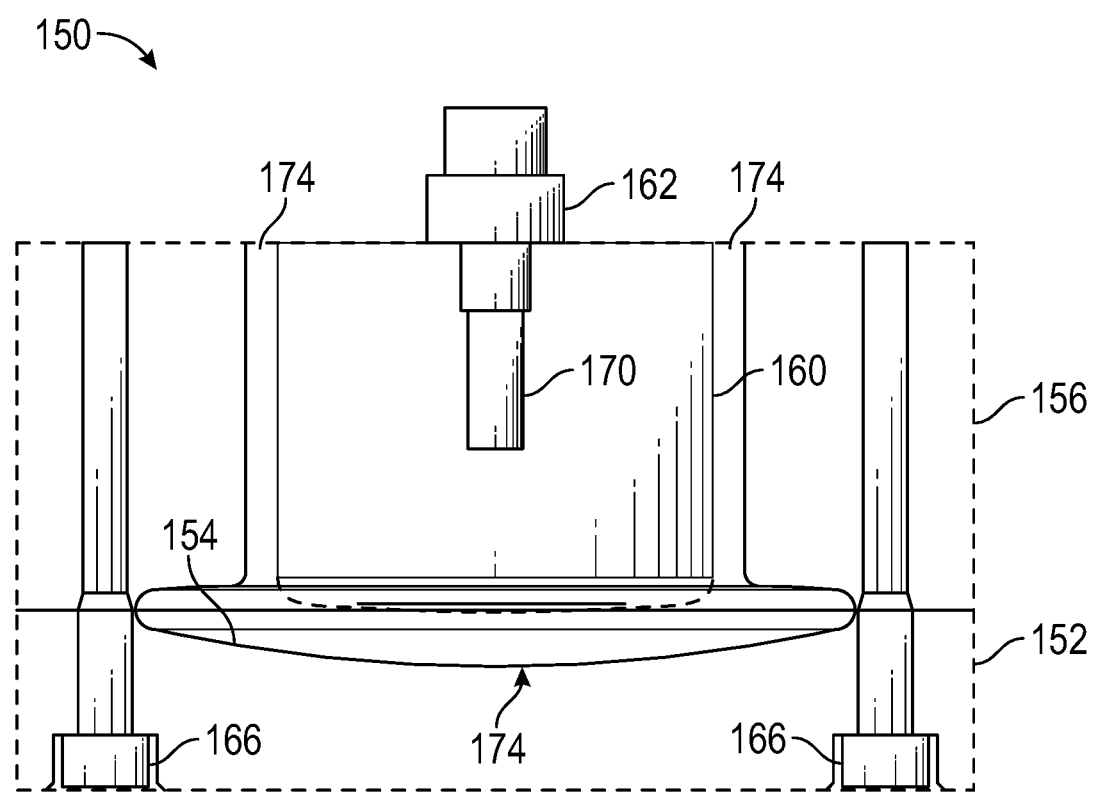
FIG. 12 is a side, partially translucent view of the molding system of FIGS. 10 and 11.
Figure 13:
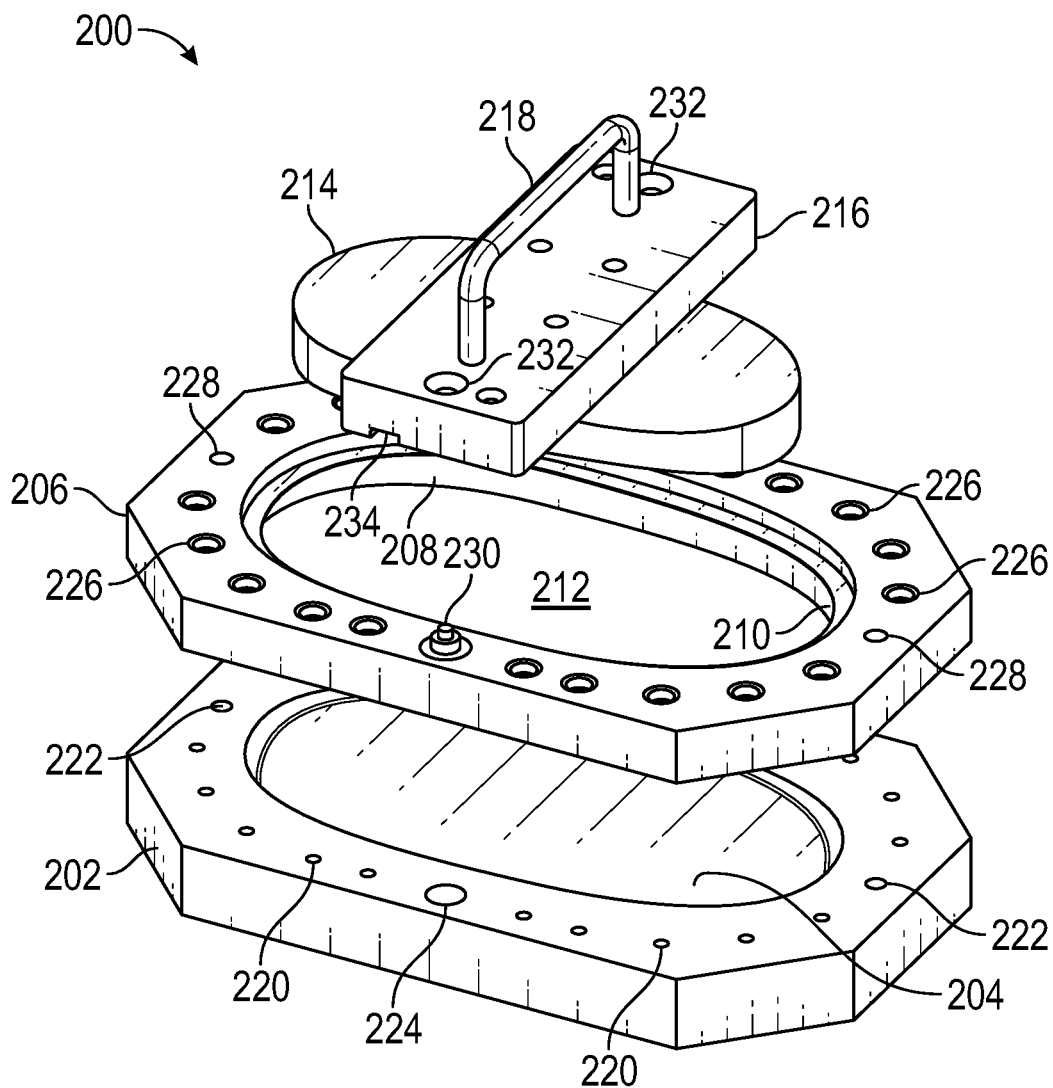
FIG. 13 is a perspective, exploded view of a molding system configured to produce a thigh tissue insert according to an embodiment of the present disclosure.

Referring now to FIGS. 10-12, shown therein are aspects of a molding system 150 suitable for manufacturing the gluteus insert 112 described above according to an embodiment of the present disclosure. In that regard, the molding system 150 includes a lower component 152 having a lower cavity 154 shaped to define the outer surface of the skin layer of the gluteus insert. An upper component 156 is configured to mate with the lower component 152 and includes an opening extending therethrough for receiving a core 160. In the illustrated embodiment, the opening 158 has a circular cross-section and the core 160 has a generally cylindrical shape configured to be received within the circular cross-section of the opening. In that regard, the diameter of the core 160 is smaller than the diameter of the opening 158 such that a space remains around the core. In that regard, the space will be filled with material injected into the mold system 150. In some embodiments, the space around the core 160 is utilized to form the wall 136 that defines the cavity that receives the remaining layers of the gluteus insert. Accordingly, in some instances it is desirable for the core 160 to be coaxial with the opening 158 such that the wall 136 has a substantially constant thickness. To that end, the core 160 is coupled to a bridge 162 that facilitates alignment and coupling of the mold system 150. In that regard, the lower component 152 includes openings 164 for receiving fasteners 166 that engage upper component 156. In some instances, the fasteners 166 are threaded and the upper component 156 includes threaded openings configured to receive and mate with the threaded fasteners. However, any suitable manner of releasably securing the lower component 152 to the upper component 156 may be utilized. Similarly, the bridge 162 includes openings 168 for receiving fasteners 170 that engage corresponding openings 172 in the upper component. Again, in some instances, the fasteners 170 are threaded and the openings 172 are threaded to receive and mate with the threaded fasteners. However, any suitable manner of releasably securing the bridge 162 and core 160 to the upper component 156 may be utilized.

Figure 14:
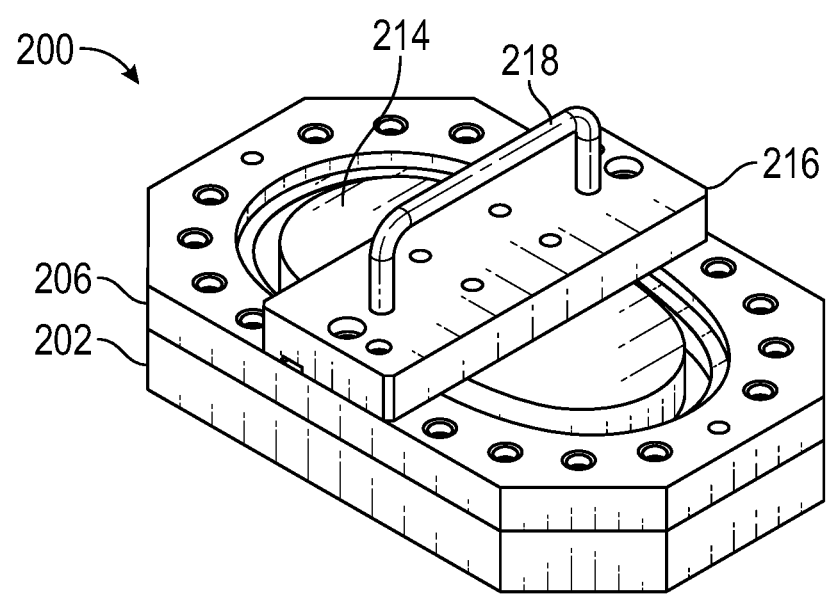
FIG. 14 is a perspective, assembled, partially translucent view of the molding system of FIG. 13.
Figure 15:
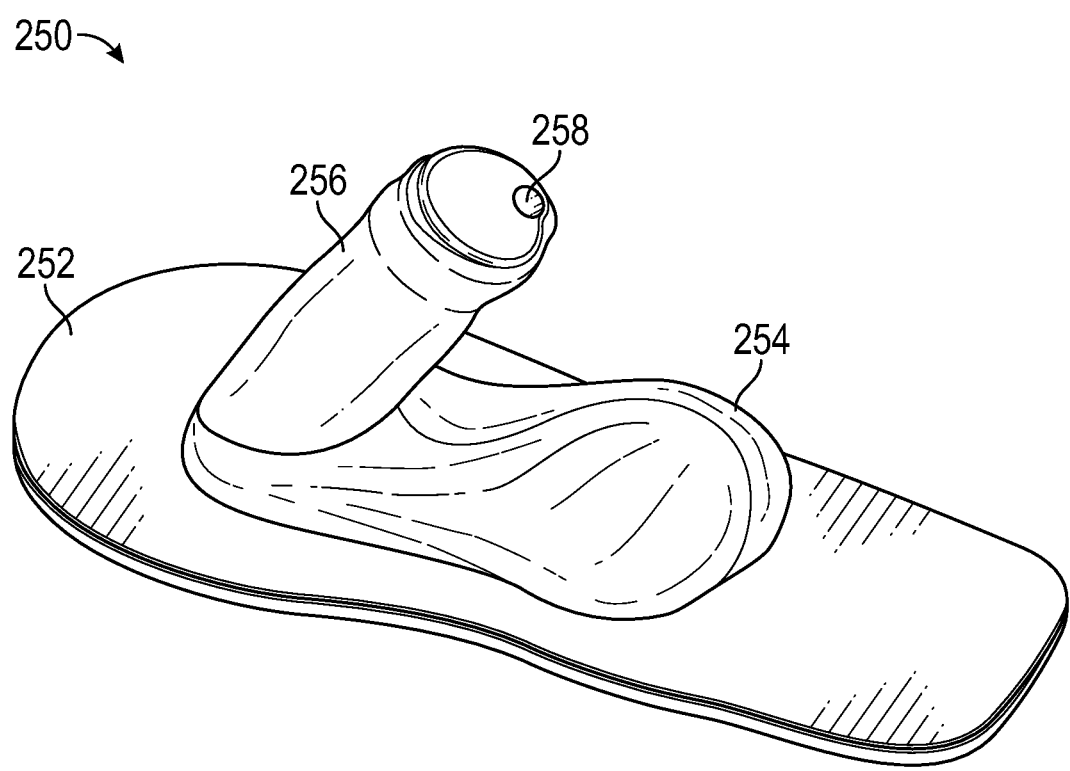
FIG. 15 is a perspective view of a male genitalia model according to an embodiment of the present disclosure.

Referring now to FIGS. 14 and 15, shown therein are aspects of a molding system 200 suitable for manufacturing the thigh insert 116 described above according to an embodiment of the present disclosure. In that regard, the molding system 200 includes a lower component 202 having a lower cavity 204 shaped to define the outer surface of the skin layer of the gluteus insert. An upper component 206 is configured to mate with the lower component 202 and includes a contoured surface 208 and a lip 210 for defining structural aspects of the resulting tissue insert. Further the upper component 206 includes an opening 212 extending therethrough. In the illustrated embodiment, the opening 212 has a generally elliptical or oval shape. The molding system 200 also includes a core 214 configured to be placed, at least partially, through the opening 212 of the upper component 206. The core 214 also has a generally elliptical or oval outer profile such that it can be received within the opening 212 of the upper component. In that regard, the core 214 is sized and shaped such when the mold system 200 is assembled, as shown in FIG. 14, the bottom surface of the core is generally equally spaced from the cavity 204 of the lower component 202 such that a skin layer produced using the molding system will have a substantially constant thickness. Accordingly, in some instances it is necessary to align the core 214 with the lower and/or upper components 202, 206. To that end, the core 214 is coupled to a bridge 216 that facilitates alignment and coupling of the mold system 200. In that regard, the lower component 202 includes openings 220, 222, and 224, while the upper component 206 includes openings 226 and 228 along with an alignment structure 230. Further, the bridge 216 includes openings 232 that are configured to interface with the alignment structure(s) 230 of the upper component 206. Generally, the openings 220, 222, 224, 226, and 228 of the lower and upper components 202, 206 are configured to receiving fasteners that secure the lower and upper components 202, 206 together. In some instances, the fasteners 166 are threaded and include a nut. In other instances, at least one of the openings is threaded and configured to receive a threaded fastener. However, any suitable manner of releasably securing the lower component 202 to the upper component 206 may be utilized. Similarly, any suitable manner of releasably securing the bridge 216 and core 214 to the upper component 206 may be utilized.

When using the molding systems 150, 200 or other similar molding system, the first formed layer of the insert forms the skin. In some instances, it is manufactured from a platinum-cured silicone thermoset or a platinum-cured silicone thermoset blend with a shore hardness as low as 00-10 but no higher than 30 A. Silicone pigments are added to represent light, medium, or dark skin tones. In some embodiments, two or more different platinum-cured silicones are blended to optimize hardness, needle puncture, tissue cutting, and suture retention. In some instances, higher durometer materials provide optimized tear strength for suture retention, but they are too hard to replicate the feel of skin. In order to achieve the best of both worlds, it becomes necessary to blend materials with a higher shore hardness with materials with a lower shore hardness, resulting in a product whose shore hardness falls in between the two extremes, based on the ratio of the mixture. A silicone blend featuring a platinum-cured silicone thermoset with a shore hardness of 00-45 (TC 5101, BJB Enterprises, Tustin, Calif.) and a platinum-cured silicone thermoset with a shore hardness of 10 A (Dragon Skin® 10 Medium, Smooth-On, Inc., Easton, Pa.) has been found by the inventors to be most successful for use as a skin material that has to endure needle puncture, cutting, and suture retention. The recommended percentage of 00-45 ranges from 0-100%, where the preferred blend sets the ratio between the 00-45 and 10 A materials to 1:1.

The second formed layer of the insert forms the subcutaneous or fat layer. In some instances, this layer is manufactured from a blend of silicone foam, silicone thermoset, and silicone oil with added pigments for color matching. In some implementations, the silicone foam is a soft, two-component, platinum silicone castable foam; the silicone thermoset is a platinum-cured silicone thermoset with a shore hardness as low as 00-10 but no higher than 00-30; and the silicone oil is a polydimethyl siloxane with a viscosity between 80-110 centipose. In one embodiment, the silicone foam (Soma Foama, Smooth-On, Inc., Easton, Pa.) ranges from 10-35% of the total weight, the silicone thermoset has a shore hardness of 00-10 (Silicone 99-255, Smooth-On, Inc., Easton, Pa.) and ranges from 15-60% of the total weight, and the silicone oil (TC-5005 C, BJB Enterprises, Tustin, Calif. or F-100, SILPAK, Inc., Pomona, Calif.) ranges from 10-60% of the total weight. The preferred blend to optimize the realism of the subcutaneous layer sets the percentage of foam to 13%, the percentage of silicone thermoset to 25%, and the percentage of oil (TC-5005 C, BJB Enterprises, Tustin, Calif.) to 62%. This blend creates a layer that accurately represents the hardness and consistency of the subcutaneous layer while allowing realistic blunt dissection.

The third formed layer of the insert forms the fascia. This is a dense layer of connective tissue that is resistant to unidirectional tension forces and surrounds muscles, organs, and other soft structures. In some instances, Tyvek is utilized to form the fascia as it responds in a manner similar to the fascia when punctured, cut, and/or sutured. In some specific instances, the material used is Tyvek® Soft Structure Type 14 (DuPont, Wilmington, Del.) as this is a flexible fabric-like soft structure with good tear resistance. Tyvek is a spunbonded olefin material.

The fourth formed layer of the insert forms the muscle. As discussed above, the muscle layer offers greater resistance to needle puncture when compared to the skin and subcutaneous layers. As a consequence, the shore hardness of this layer must be greater than that of the skin and subcutaneous layers. Accordingly, in some instances the muscle layer is manufactured from a platinum-cured silicone thermoset with a shore hardness from 10 A to 50 A, and silicone pigments are added to provide realistic coloring. In one specific embodiment, the muscle layer is formed of a silicone thermoset with a shore hardness of 10 A (Dragon Skin® 10 Medium, Smooth-On, Inc., Easton, Pa.) as this most closely approximates the properties of the muscle layer.

The fifth formed layer forms the backing or back skin. Generally, the purpose of this layer is to encapsulate the muscle, fascia, and subcutaneous layers while providing a surface that sits within the insert's recess in the manikin. Accordingly, in some instances the backing is shaped to mate with corresponding structural features of the patient simulator and, in particular, the opening or recess into which the insert is designed to be placed. In some instances, the backing layer is manufactured from a platinum-cured silicone thermoset with a shore hardness ranging from 00-10 to 30 A. Generally, the backing layer should not be any harder than 30 A as this will present a distinct intersection between the skin layer and back layer. It is desirable in some instances to match the durometer of the back layer to that of the insert skin itself. Silicone pigments are added to provide realistic coloring and a color match to the skin layer. Accordingly, in some instances, the material used as the backing is a platinum-cured silicone thermoset blend such as that used for the skin. A silicone blend featuring a silicone thermoset with a shore hardness of 00-45 (TC 5101, BJB Enterprises, Tustin, Calif.) and a platinum-cured silicone with a shore hardness of 10 A (Dragon Skin® 10 Medium, Smooth-On, Inc., Easton, Pa.) that is mixed in a ratio of 1:1 is utilized in some instances.

One suitable technique for manufacturing a tissue model insert according to the present disclosure will now be described. No limitation is intended hereby and those skilled in the art will recognize that many different modifications and/or alternative manufacturing techniques may be utilized, including the use of alternative materials. In one particular embodiment, a thigh insert is manufactured using the following steps:

1) Manufacture of Skin Layer:
   a) Clean the mold and liberally apply mold release.
   b) Prepare the Skin Mixture (Materials: Dragon Skin 10 Medium & TC 5101)
      i) Measure 50 g Dragon Skin Part B, add 50 g TC 5101 Part B, add 0.4 g Silc Pig Fleshtone, add 1 drop of FuseFX Rosy Skin, add 2 Drops of FuseFX Light Skin, mix until a uniform color
      ii) Add 50 g Dragon Skin 10 Part A, add 50 g TC 5101 Part A
   c) Mix and Vacuum until all bubbles are removed
   d) Pour the Skin Mixture into the mold making sure to start pouring at the lowest point. Pour entire contents into the mold.
   e) Slowly place the mold core into position, making sure that the material doesn't overflow onto the top of the mold core.
   f) Allow to cure for 30 minutes at 100° C.
   g) Remove insert (leaving the skin in place) and clean the inner surface of the outer skin with isopropanol to remove any mold release residue.
2) Manufacture of Fat Layer
   a) Prepare the Foam Mixture (Materials: Soma Foama, Silicone 99-255, & TC 5005C)
      i) Measure 10.4 g Soma Foama Part A, add 16.2 g Silicone 99-255 Part A, add 72 g TC 5005C, add 3 drops of Silc Pig Yellow, mix until uniformly distributed
      ii) Add 5.2 g Soma Foama Part B, add 16.2 g Silicone 99-255 Part B
      iii) Mix until bubble formation and reaction begins, and mixture begins to thicken (approximately 8 minutes at 73° F.).
   b) Transfer the mixture to the mold, and continue to mix until material starts to set
   c) Allow it to cure for 2 hours at room temperature.
   d) If the foam expands above the height of the Skin, trim it so that it sits just below it.
3) Secure the Fascia
   a) Cut a piece of Tyvek Sheet (Tyvek® Type 14) to match the shape of the cavity above the fat layer
   b) Place a thin layer of silicone adhesive (Sil-Poxy©) over one side of the Tyvek Sheet, and lay the sheet over the fat layer so that the adhesive faces the fat layer. Smooth the Tyvek onto the fat layer, making sure there is no entrapped air.
   c) Allow to cure for 30 minutes at room temperature.
4) Manufacture of Muscle Layer
   a) Prepare the Muscle Layer Mixture (Material: Dragon Skin 10 Medium)
      i) Measure 50 g Part B, add 10 drops of Silc Pig Blood, mix until a uniform color
      ii) Add 50 g Part A
      iii) Mix and Vacuum until all bubbles are removed
   b) Pour the mixture into the mold slowly, making sure not to entrap air during the process. Allow to sit for 5 minutes, and burst all air bubbles
   c) Cure for 30 minutes at 100° C.
5) Manufacture of Backing
   a) Prepare the Backing Mixture (Material: Dragon Skin 10 Medium & TC 5101):
      i) Measure 25 g Dragon Skin Part B, add 25 g TC 5101 Part B, add 0.2 g Silc Pig Fleshtone, add 1 drop of FuseFX Rosy Skin, add 2 Drops of FuseFX Light Skin, mix until a uniform color
      ii) Add 25 g Dragon Skin 10 Part A, add 25 g TC 5101 Part A
   b) Mix and Vacuum until all bubbles are removed
   c) Pour the Backing Mixture over the muscle layer, making sure not to entrap air during the process. Allow to sit for 5 minutes, and burst all air bubbles
   d) Allow to cure for 30 minutes at 100° C.
6) Gently remove from mold, clean all mold release of with a mild soapy solution, dry and apply talc.
7) Inspect.

As noted above, in some instances it is useful to expand the basic multi-layer tissue inserts to include realistic products for training of suture removal, wound cleaning, packing, dressing, etc. This can be incorporated with the above materials through the use of sculpted models that replicate the geometry of a variety of wounds, including, but not limited to, decubitus ulcers, tropical ulcers, gunshot wounds, and cuts. These products can be manufactured from a multi-layer tissue construct as described above, but in some cases, it is beneficial to manufacture the product from a homogeneous platinum-cured silicone thermoset such as that used for the skin layer (with a shore hardness as low as 00-10 but no higher than 30 A). Wound detailing can be achieved through the use of pigments and silicone compatible paints, such as the M, F, and LY series paints (FuseFX, Ottawa, ON, Canada) or the Psycho Paint® Platinum Silicone Paint Base (Smooth-On, Inc., Easton, Pa.).

As with the standard model inserts, these models can be fit directly into recesses in the manikin. For example, a suture removal thigh model 124 is illustrated in FIG. 6 received within the leg of a patient simulator. This model 118 can replace a standard leg insert, and it includes a raised, partially healed leg wound that can hold a standard suture and can be used to train medical personnel on appropriate suture removal techniques. This model 118 is a multi-layer model that includes the skin, subcutaneous, fascia, and muscle layers, and additional pigmenting/painting is included on the scar line to improve realism. FIG. 7 shows a tropical ulcer wound overlay 124 for a thigh model insert. The wound overlay 124 and can be placed on any region of the manikin. In some instances, the wound overlay 124 is manufactured from a 00-30 platinum-cured silicone thermoset (Ecoflex® 0030, Smooth-On, Inc., Easton, Pa.) that is painted with a combination of silicone paints (M-Series and F-Series, FuseFX, Ottawa, ON, Canada) to enable wound realism. The wound overlay 124 can be used to train wound cleaning, packing, and dressing. FIG. 8 shows two different decubitus ulcers at different stages. Namely, ulcer 130 is in the early stages, whereas ulcer 132 is advanced. Such ulcers can be used on any portion of the patient simulator and used for training wound cleaning, packing, and dressing. The decubitus ulcers 130, 132 can be manufactured as either a multi-layer construct, such as that adopted for the tissue model inserts discussed above, or as a homogeneous silicone thermoset, such as that used for the wound overlay. Again, the application of silicone paints aid in wound realism.

The tissue model inserts of the present disclosure provide a better refined multi-layer tissue construct that accurately represents the skin, subcutaneous, fascia, and muscle layers. The improvements made to the layers have increased the functionality and realism of the tissue inserts. These tissue model inserts provide a cost-effective platform for the training of subcutaneous injection, intramuscular injection, surgical techniques, wound closure techniques, and dermal suture removal. In the case of injection, the skin layer reseals and can be re-used multiple times for the training of this procedure. The inserts provide a close approximation to an actual patient, thereby creating a more realistic training model. The inserts are disposable inserts that can be incorporated in a high, medium, or low fidelity manikin. Further, the various materials utilized for manufacturing the inserts, as outlined above, are stable in a variety of environmental conditions, so shipping, storage, and/or use conditions have negligible impact on the product and how it functions.

Figure 16:
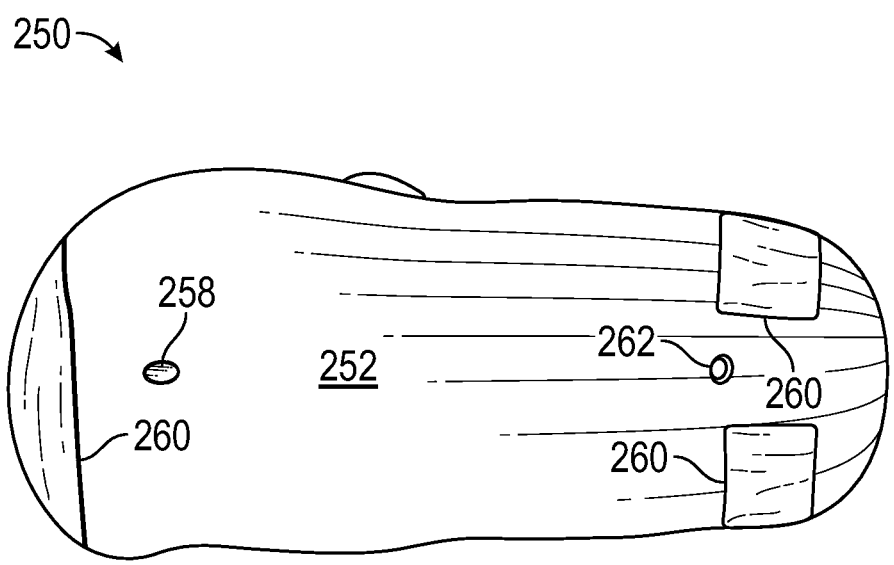
FIG. 16 is a back view of the male genitalia model of FIG. 15.

Referring now to FIGS. 15 and 16, shown therein is a male genitalia model 250 according to an aspect of the present disclosure. The male genitalia model 250 can be manufactured with varying degrees of complexity for the development of models for catheterization, testicle self-examination (TSE), and/or circumcision. The model introduces improvements to currently available male genitalia models by implementing materials that provide a closer approximation to a human patient. Further, increased functionality, such as that required for TSE, can be introduced through the incorporation of a multi-layer structure. In addition, a foreskin can be included in the model for the training of circumcision. Finally, the male genitalia model 250 can be attached to a high, medium, and/or low fidelity manikin and/or task trainer and/or it can be fixed on a support stand and sold independently.

The male genitalia model 250 of the present disclosure provides a more realistic alternative for the training of catheterization, TSE, and/or circumcision. As shown in FIG. 15, the model 250 includes a backing or support layer 252, scrotum 254, and penis 256. An opening 258 extends through the penis 256 to simulate the urethra. The backing 252 is included to allow the model 250 to be secured to either a manikin or a support stand. In the case of a manikin, hook-and-loop fasteners and/or other suitable fasteners can be attached at designated locations to mate to corresponding hook-and-loop fasteners and/or other suitable fasteners those on the manikin. For example, FIG. 16 shows hook-and-loop fasteners 260 according to one arrangement of the present disclosure. Further, tubing can connect the opening 258 simulating the urethra outlet on the model 250 to a urethra inlet of the manikin. In some embodiments, an anus opening or recess 262 is formed in the backing 252.

Figure 17:
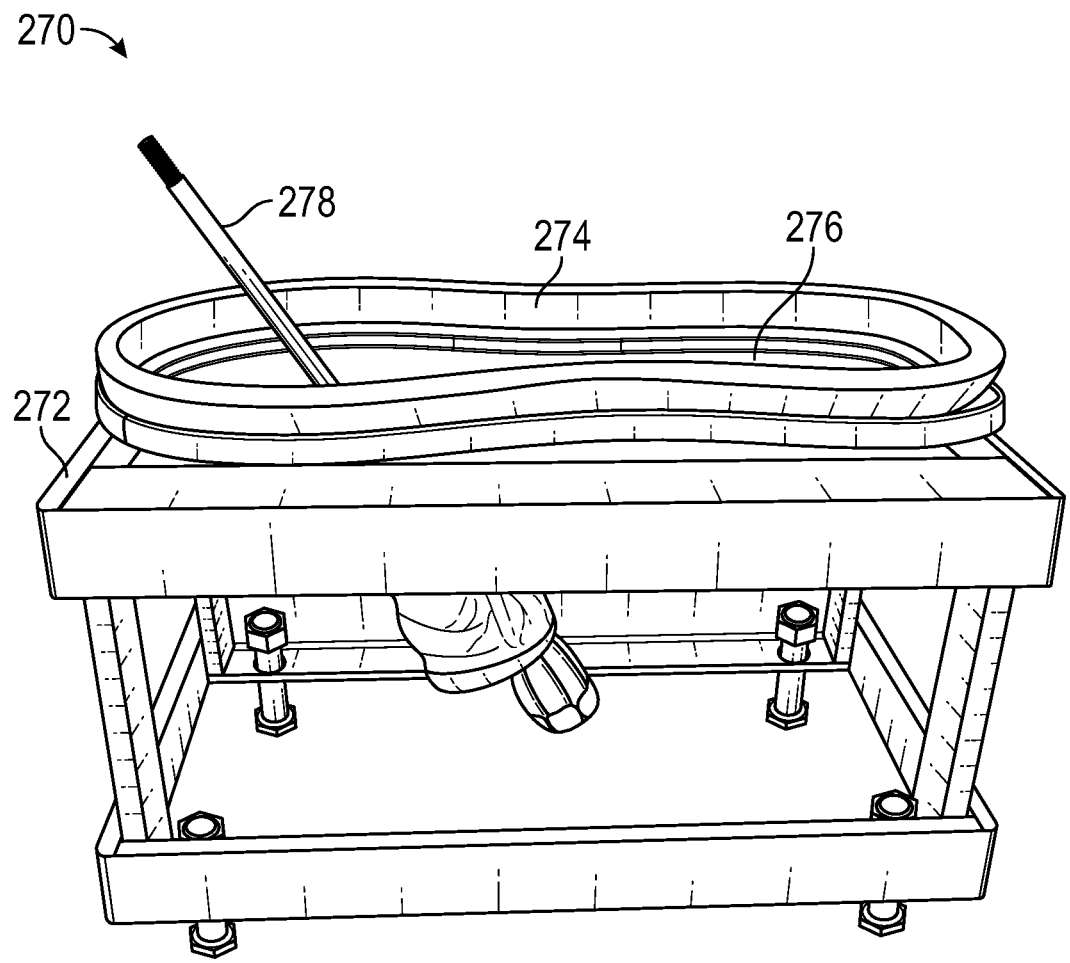
FIG. 17 is a perspective view of a molding system configured to produce the male genitalia model of FIGS. 15 and 16 according to an embodiment of the present disclosure.
Figure 18:
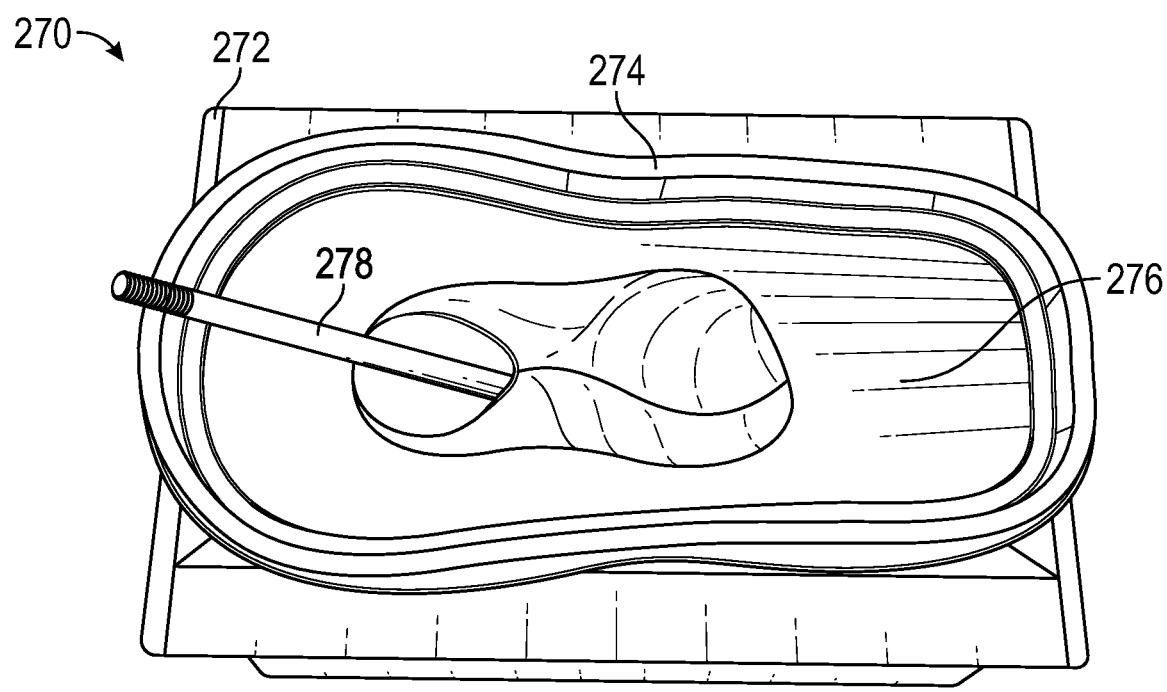
FIG. 18 is a top view of the molding system of FIG. 17.

Referring now to FIGS. 17 and 18, the male genitalia are manufactured in a molding system 270. In that regard, the molding system 270 includes a support stand or structure 272 that holds a mold 274 having an inner cavity 276 shaped to form the male genitalia model 250. The mold 274 is configured to receive a shaft 278 that is utilized to form the opening 258 that simulates the urethra. A sculpted model forms the basis of the geometry for the inner cavity 276 of the mold 274, where detailing of the frenulum, sulcus, and skin texture of the penis and scrotum are included for improved realism. Due to the complexity of the geometry and the extent of undercuts in the model, a nickel-deposition mold is utilized in some instances. The removable urethral shaft also aids de-molding the model 250 from the mold 274. For a basic catheterization or circumcision model, the mold is filled to the level of the back skin and allowed to cure. The basic model is purely for the training of male catheterization. It incorporates soft, flexible materials that can be flexed and held in tension, but who recoil and return to their original geometry when released. The urethra can be catheterized with any catheter of size 18 FR or smaller. The entire model is manufactured from one homogeneous material, so the properties are equivalent throughout.

In the case of a TSE model, an insert mold is manufactured to create the scrotal cavity. In some instances, an appropriately shaped insert mold is manufactured in a similar way as taught in U.S. patent application Ser. No. 13/031,102, filed Feb. 18, 2011 and titled "Breast Tissue Models, Materials, and Methods," and U.S. Provisional Patent Application No. 61/305,982, filed Feb. 19, 2010 and titled "Polysiloxane Materials and Methods that Mimic Tissue," each of which is hereby incorporated by reference in its entirety. The scrotal area of the mold is clayed to represent the scrotum skin. The thickness of the clay ranges from 2 mm to 8 mm, but in one embodiment is approximately 4 mm. The recommended material for the insert mold is an aluminum-filled urethane with a shore hardness of 88 D (Task® 18, Smooth-On, Inc., Easton, Pa.). The aluminum filling aids the urethane in heat transfer, thereby improving the manufacturability. The cure time of platinum-cured silicones is decreased at elevated temperatures. The TSE model can be incorporated into the basic model so that the scrotum area becomes a multi-layer construct that includes the testes, epididymis, spermatic cord, and tumors. By including a detailed epididymis, the difference between it and a tumor can be identified. For the circumcision model, a foreskin, that can be retracted to expose the glans, is included. The model can be used to train the steps in circumcision, including skin prep and draping, excision of the foreskin, suturing, and wound dressing.

The flexibility of the catheterization model is critical to proper function and realistic training. The urethra in a male has two 90° bends which make it difficult to catheterize. Therefore, to aid in catheterization, the penis is typically rotated so that it is perpendicular to the plane of the body. This removes one of the bends in the urethral passage and assists the catheterization process. As a consequence, the material selected for use in the model 250 must be flexible enough to rotate the penis 90° without kinking. The basic catheterization model is manufactured as a single pour in some instances. In some implementations, the model is manufactured from a platinum-cured silicone thermoset or a platinum-cured silicone thermoset blend with a shore hardness as low as 00-10 but no higher than 30 A, and silicone pigments are added to provide a realistic color match to light, medium, or dark skin tones. Lower durometer materials tend to be tackier and more susceptible to marking, so it is often beneficial to blend low and higher durometer materials to make a compromise between flexibility and durability. Inventors have found that a silicone blend featuring a platinum-cured silicone thermoset with a shore hardness of 00-10 (Silicone 99-255, Smooth-On, Inc., Easton, Pa.) and a platinum-cured silicone thermoset with a shore hardness of 00-30 (Ecoflex® 0030, Smooth-On, Inc., Easton, Pa.) is the most successful for use in the basic catheterization model. The recommended percentage of the 00-30 ranges from 20-60% of the total weight, where the preferred percentage of 00-30 is 28%.

A sculpted model also forms the basis for the TSE model, where the detailing of the penis, scrotum, and testicular assembly accurately represents the natural anatomy. The TSE model can be used to train both catheterization and TSE. Whereas a basic catheterization model may be formed of a single pour or layer, the TSE model is composed of three layers, with the testicular assembly inserted in the second layer in some instances. The three layers include the 1) penis and scrotal skin, 2) scrotal cavity, and 3) backing. The testicular assembly incorporates the epididymis, testes with embedded tumors, and spermatic cord. The testes are free to move within the scrotal cavity. The first layer that forms the penis and skin is manufactured from a platinum-cured silicone or silicone blend as detailed in the basic catheterization model. The second layer forms the scrotal cavity. The second layer is manufactured from a blend of platinum-cured silicone thermoset and silicone oil in some instances. For example, in some embodiments the silicone thermoset has a shore hardness as low as 00-10 but no higher than 00-30, and the silicone oil is a polydimethyl siloxane with a viscosity between 80-110 centipose. In one embodiment, the silicone thermoset has a shore hardness of 00-10 (Silicone 99-255, Smooth-On, Inc., Easton, Pa.) and ranges from 50-90% of the total weight, and the silicone oil (TC-5005 C, BJB Enterprises, Tustin, Calif. or F-100, SILPAK, Inc., Pomona, Calif.) ranges from 10-50% of the total weight. The present inventors have found that the preferred blend to optimize the realism of the scrotum sets the percentage of the thermoset to 67% and the percentage of the oil (TC-5005 C, BJB Enterprises, Tustin, Calif.) to 33%. This blend creates a layer that is soft and pliable and allows palpation of the testicles. In some embodiments, the TSE model can also include Vas Deferens, and the model can be used for the training of no-scalpel vasectomy. For surgical procedures such as this, the model is disposable.

The third layer forms the backing or back skin. The purpose of this layer is to encapsulate the scrotal cavity and testicular assembly. This layer is manufactured from a platinum-cured silicone thermoset or a platinum-cured silicone thermoset blend with a shore hardness as low as 00-10 but no higher than 30 A, and silicone pigments are added to provide a color match to layer 1. It is best to match the durometer of the backing to that of the skin in order to maintain the same flexibility throughout. The preferred material is a blend of platinum-cured silicone thermosets with the first thermoset with a shore hardness of 00-10 (Silicone 99-255, Smooth-On, Inc., Easton, Pa.) and the second thermoset with a shore hardness of 00-30 (Ecoflex® 0030, Smooth-On, Inc., Easton, Pa.). As with the skin, the preferred percentage of 00-30 is 28%.

In some embodiments, the testicular assembly is manufactured from a platinum-cured silicone thermoset with a shore hardness as low as 00-20 but no higher than 30 A. The testes, epididymis, and spermatic cord are each manufactured from the same shore hardness material; however, the tumors shore hardness is higher in order to palpate the difference between a tumor, testicle, or epididymis. In some instances, the material used for the testicles, epididymis, and spermatic cord is a platinum-cured silicone thermoset with a shore hardness of 00-30 (Ecoflex® 0030, Smooth-On, Inc., Easton, Pa.). In some instances, the material used for the tumors is a platinum-cured silicone thermoset with a shore hardness of 10 A (Dragon Skin® 10 Medium, Smooth-On, Inc., Easton, Pa.).

Like the basic catheterization model and the TSE model, a sculpted model forms the basis for the circumcision model. The only difference between this male genitalia model and those discussed above is the addition of a retractable foreskin. It is possible to include the foreskin for both a basic catheterization model and a TSE model, but when the model is used as a circumcision trainer, the foreskin cannot be replaced, so it is a 1-time use disposable model. The materials used for the circumcision model are identical to those described in the basic catheterization model and TSE model.

One suitable technique for manufacturing a male genitalia model according to the present disclosure will now be described. No limitation is intended hereby and those skilled in the art will recognize that many different modifications and/or alternative manufacturing techniques may be utilized, including the use of alternative materials. In one particular embodiment, a male genitalia model is manufactured using the following steps:

1) Manufacture of Tumors (Material: Dragon Skin 10 Medium)
   a) Measure 30 g Part B, add 3 drops of FuseFX Tan Flesh, 12 drops of FuseFX Warm Rosy Skin, and 30 g of Part A
   b) Mix and Vacuum until all bubbles are removed
   c) Pour into silicone lump molds
   d) Cure in a 100° C. Oven for 30 minutes
   e) De-mold and clean with isopropanol
2) Manufacture of Testicular assembly
   a) Clean the mold and liberally apply mold release
   b) Place the tumors in their designated locations in the tumor mold
   c) Seal the mold in preparation for injection.
   d) Prepare the Testicle Mixture (Material: Ecoflex® 0030)
      i) Measure 30 g of Part B, 4 drops of FuseFX Light Skin, 4 drops of FuseFX Tan Skin, and 2 drops of FuseFX Warm Rosy Skin.
      ii) Mix and Vacuum until all bubbles are removed
      iii) Place in Taper Tip syringe and inject into mold until material flows from vent holes
      iv) Cure in a 100° C. oven for 30 minutes
   e) Remove from mold and coat testicles, epididymis, and tumors with Vaseline 3) Manufacture of Penis and Scrotal Skin
   a) Clean the mold and liberally apply mold release.
   b) Secure the urethral rod shaft in place
   c) Prepare the skin mixture (Materials: Silicone 99-255 and Ecoflex 0030)
      i) Measure 100 g of Silicone 99-255 Part B, add 38.5 g Ecoflex 0030 Part B, add 7 drops of FuseFX Light Skin, add 7 drops of FuseFX Tan Skin, add 6 drops of FuseFX Warm Rosy Skin, and mix until a uniform color.
      ii) Add 100 g of Silicone 99-255 Part A, add 38.5 g Ecoflex 0030 Part A
      iii) Mix and Vacuum until all bubbles are removed
   d) Pour the mixture into the mold making sure to start pouring at the lowest point, which is the glans. Pour the entire contents into the mold.
   e) Slowly place the insert mold into position, making sure that the material does not overflow onto the top of the insert mold
   f) Allow to cure for 30 minutes at 100° C.
   g) Remove the insert (leaving the skin in place) and clean the inner surface of the skin with isopropanol to remove any mold release residue.
4) Manufacture of Scrotal Cavity
   a) Orient the testicular assembly within the scrotal cavity
   b) Prepare the cavity mixture (Materials: Silicone 99-255 and TC 5005C)
      i) Measure 30 g of Silicone 99-255 Part B, add 30 g of TC 5005C, add 3 drops of FuseFX Light Skin, add 3 drops of FuseFX Tan Skin, add 2 drops of FuseFX Warm Rosy Skin, and mix until a uniform color.
      ii) Add 30 g of Silicone 99-255 Part A
      iii) Mix and Vacuum until all bubbles are removed
   c) Pour the mixture into the mold so that it reaches the level of the pour for the skin. Do not allow the mixture to over flow.
   d) Allow to cure for 30 minutes at 100° C.
5) Manufacture of Backing
   a) Prepare the Backing Mixture (Materials: Silicone 99-255 and Ecoflex 0030)
      i) Measure 75 g of Silicone 99-255 Part B, add 28.9 g Ecoflex 0030 Part B, add 5 drops of FuseFX Light Skin, add 5 drops of FuseFX Tan Skin, add 4 drops of FuseFX Warm Rosy Skin, and mix until a uniform color.
      ii) Add 75 g of Silicone 99-255 Part A, add 28.9 g Ecoflex 0030 Part A
      iii) Mix and Vacuum until all bubbles are removed
   b) Pour the mixture into the mold making sure to start pouring at the lowest point. Fill the mold completely
   c) Allow to cure for 30 minutes at 100° C.
6) De-mold the model and attach the Velcro, and punch the hole for the anus.
   a) Remove the urethral shaft and gently remove the model from the mold. Clean the mold release residue off the part.
   b) Attach the loop Velcro, in the three locations shown below, with a cyanoacrylate such as Loctite 401.
   c) Punch a ⅛" hole in the location shown below for the anus
   d) Apply talc to the mold
   e) Transfer to Quality Inspection.

An advantage of the male genitalia models of the present disclosure over previously available models is that the materials adopted allow far superior flexibility for catheterization. The penis can be manipulated so that it is oriented 90° to the plane of the body, and no kinking occurs. This means that the model can be catheterized in an equivalent manner to an actual patient. The incorporation of the different silicones has provided a model that closely approximates the natural human tissue. Another advantage to this model is the increased functionality. The catheterization model can be combined with a TSE model, providing a more inclusive model for training of men's healthcare. In that regard, this model can be incorporated in existing manikins and task trainers, or it can be used as a stand-alone package. Further, the model can include a foreskin for the training of circumcision. Studies have shown that male circumcision significantly reduces the risk of acquiring HIV. Finally, the resulting models are highly durable, so they can be used for multiple catheterization and TSE procedures, but, at the same time, it is of low cost, so it can be a disposable option for circumcision training.

Many other products can be manufactured from materials similar to those disclosed herein for the male genitalia model and other tissue inserts. For instance, the soft platinum cured silicone thermosets and silicone thermoset blends can be applied in the production of simulated ostomies, cervices, birth canals, and skins so that realism is achieved. Ostomies are manufactured from a platinum-cured silicone thermoset or silicone thermoset blend with a shore hardness as low as 00-10 but no higher than 00-45. The preferred material is a blend of a 00-10 silicone thermoset (Silicone 99-255, Smooth-On, Inc., Easton, Pa.) with a 10 A silicone thermoset (Dragon Skin® 10 Medium, Smooth-On, Inc., Easton, Pa.) shore hardness platinum-cured silicone thermosets in a 3:1 ratio. Silicone pigments are added to provide a realistic color. Cervices are manufactured from a platinum-cured silicone thermoset with a hardness as low as 00-10 but no higher than 00-45. The preferred material for use in the cervix is a 00-30 platinum-cure silicone thermoset (Ecoflex® 0030, Smooth-On, Inc., Easton, Pa.) with silicone pigments to achieve a realistic color match. Birth canals are manufactured from a platinum-cured silicone thermoset with a shore hardness as low as 00-10 but no higher than 00-45. The preferred material for use in the birth canal is a 00-30 platinum-cured silicone thermoset (Ecoflex® 0030, Smooth-On, Inc., Easton, Pa.) with silicone pigments to achieve a realistic color match. It is also possible to embed targets of varying hardness within the body of the birth canal. These targets or landmarks can be used to represent the ischial spines, sacrum, or coccyx. The targets can be manufactured from platinum cured silicone thermosets with a hardness ranging from 10 A to 50 A, or harder durometer materials can be implemented, such as urethane plastics of hardness 60 D to 85 D. Silicone skins are manufactured from a platinum-cured silicone thermoset with a shore hardness as low as 00-30 but no higher than 30 A. The preferred material is a 00-45 platinum-cured silicone thermoset (TC 5101, BJB Enterprises, Tustin, Calif.) with silicone pigments to achieve a realistic color match. The benefits to implementing silicone as a skin substitute include improved texture and increased elasticity. The improved texture adds to the overall realism of the product by providing a skin that feels much like a human's, including equivalent resistance to needle puncture. The increased elasticity and flexibility provide greater range of motion and, in the case of chest skins, improved chest rise under lower applied forces.

Figure 19:
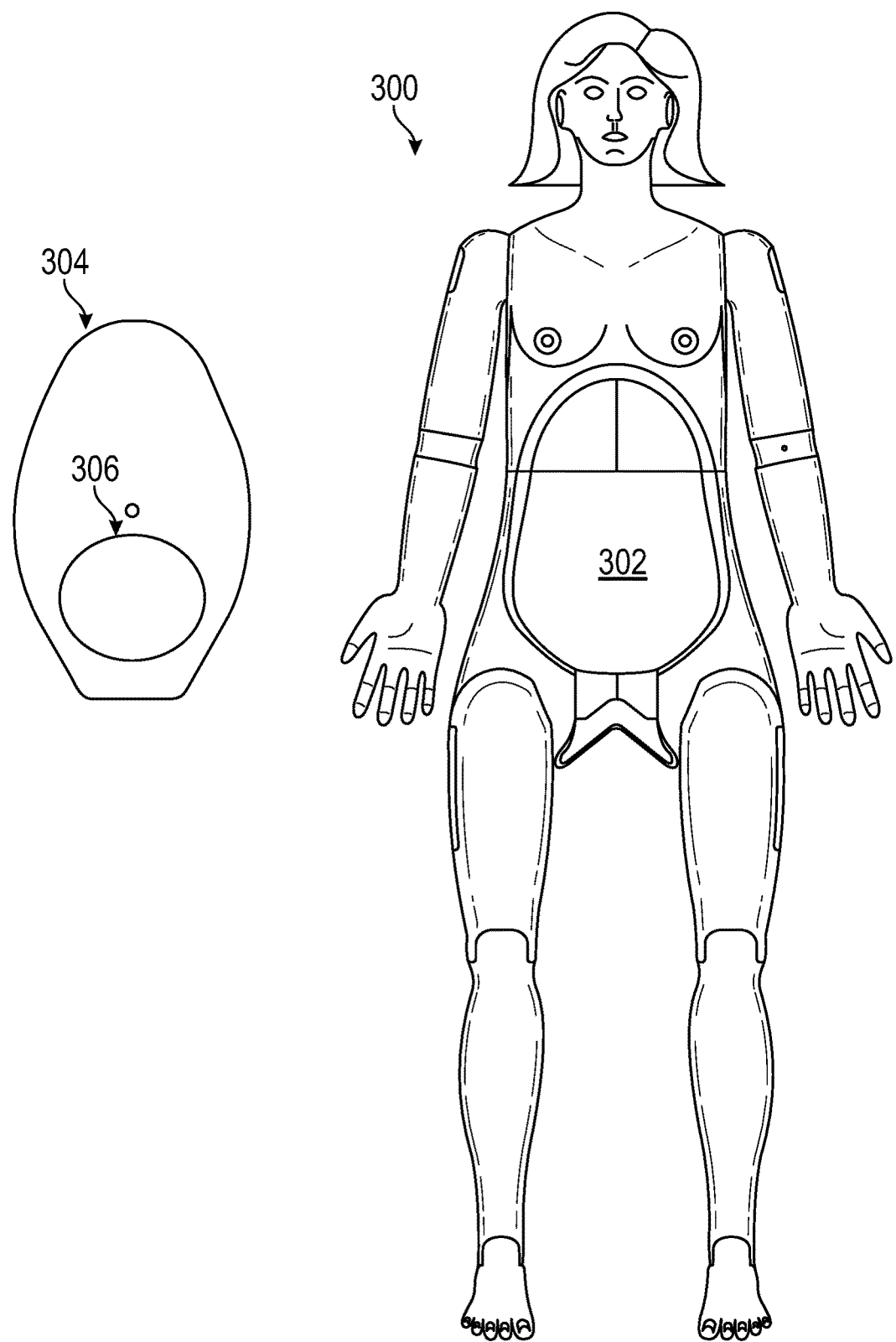
FIG. 19 is an exploded top view of a patient simulator having a surgical tummy cover according to another embodiment of the present disclosure.

Referring now to FIGS. 19-32, aspects of a surgical insert according to an embodiment of the present disclosure will be discussed. Referring initially to FIG. 19, shown therein is a patient simulator 300 that may include one or more features similar to patient simulator 100 discussed above. With respect to the current discussion, the patient simulator 300 includes an abdominal opening 302 in its torso. In that regard, the patient simulator 300 includes a tummy cover 304 that is configured to be received within the opening 302 to form the abdominal region of the simulator 300. In that regard, the tummy cover 304 includes an abdominal wall surgical insert 306. The following discussion will be focused on aspects of the abdominal wall surgical insert 306.

The abdominal wall surgical insert 306 is configured to be used in surgical manikins and/or task trainers. By using the insert 306, medical students will be able to learn and practice surgical techniques in a more realistic setting. In some instances, the insert 306 utilizes a multi-layer design that includes skin, adipose, fascia, muscle and peritoneum membrane, making it a lifelike simulation tool in the medical field. Accordingly, in some instances layers of the insert 306 are formed in a similar manner to the layers of other tissue models of the present disclosure. In some implementations, the surgical insert 306 provides medical students or other users with a faithful model of the abdominal wall to be used in surgical procedures such as: C-Sections, hysterectomies, laparoscopies and others where incisions in the abdominal wall are necessary. Users are able to place the surgical insert within a pre-made cavity in the abdominal region of the tummy cover. The position of the opening or cavity in the tummy cover is oriented based on the desired procedure(s) to be taught. In some instances, the tummy cover includes multiple openings and/or cavities to receive multiple surgical inserts. As soon as the surgical insert is secured in place, medical students and personnel will be able to make incisions in the abdominal wall that provide the feel and realism of each layer of tissue. In that regard, skin, subcutaneous, fascia, muscle and peritoneum layers are included in the insert, all exhibiting the appearance and feel of the natural human abdomen. Further, once the procedure is completed, the user can also practice suturing techniques as executed in a surgical setting on the surgical insert.

Figure 20:
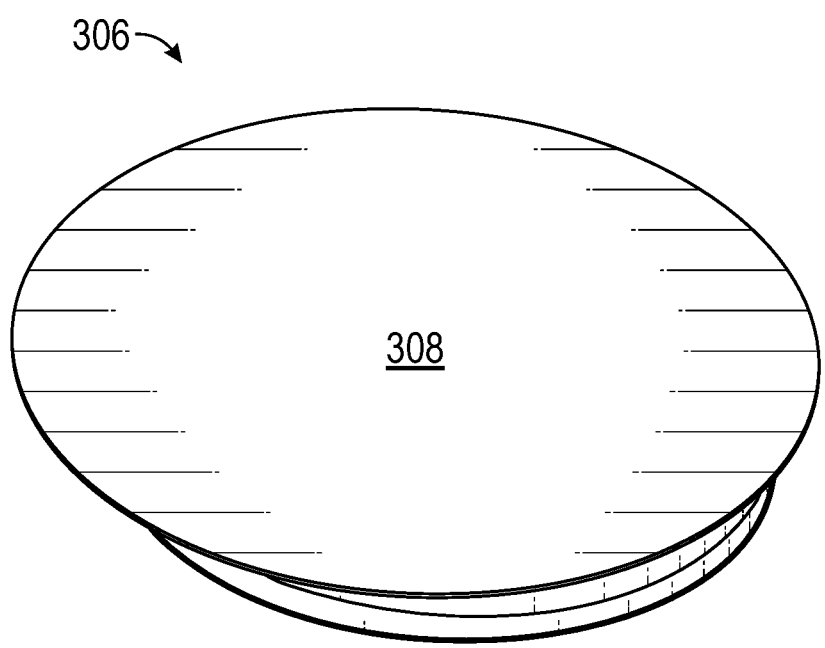
FIG. 20 is a perspective view of a surgical insert for the surgical tummy cover of the patient simulator of FIG. 19 according to an embodiment of the present disclosure.
Figure 21:
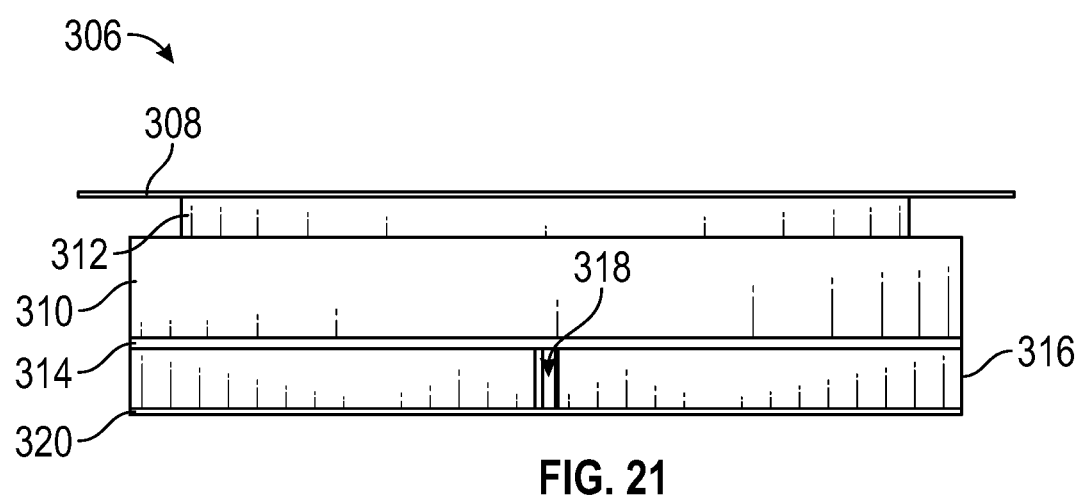
FIG. 21 is a side view of the surgical insert of FIG. 20.

Referring now to FIGS. 20 and 21, the surgical insert 306 includes multiple layers. In particular, the surgical insert 306 includes a skin layer 308 that defines an outer surface of the insert. Underneath the skin layer 308 is a subcutaneous layer 310. As best seen in FIG. 21, a recess or undercut 312 is formed in the subcutaneous layer 310 adjacent the skin layer 308. The undercut 312 is utilized to place and secure the surgical insert 306 on the tummy cover in some instances. A fascia layer 314 is positioned beneath subcutaneous layer 310. A muscle layer 316 is formed beneath the fascia layer 314. As shown, an opening 318 extends through a central portion of the muscle layer 316 as will be discussed in greater detail in the context of FIGS. 25-30 below. Finally, a peritoneum layer 320 is formed underneath the muscle layer 316.

As shown in FIG. 20, each of the five layers of the abdominal wall surgical insert (AWSI) is generally formed to follow an elliptical pattern and approximate the thickness of the human anatomy. An elliptical outline was chosen to account for the fact that most C-section incisions are made using a transverse cut. In addition the cited pattern compliments the abdominal wall geometry, giving the overall assembly a smooth appearance. Research was also completed in order to estimate the thicknesses of the existing layers. Maximum and minimum depth values were identified for each layer, and fixed values were tested in order to produce suitable results in areas such as: ease of cut, feel, structural support and attachment to surrounding tissue. Similarly, various materials were identified to best simulate the natural anatomy.

The skin layer 308 is the first layer of the abdominal insert 306. Silicone pigments are used to match the color of the artificial skin to any required skin color. In some embodiments, the skin layer 308 is made as a blend of two platinum cure silicone thermosets of shore 00-30 and 10 A hardness. This combination was found to be the most suitable for this kind of application, offering good suture retention and proper texture while making incisions. Viscosity of the materials was also considered as this insert is manufactured by pouring. A proper viscosity was achieved by combining materials of low and high mixed viscosities at an appropriate ratio. The material with hardness 00-30 (Ecoflex® 00-30, Smooth-On, Inc., Easton, Pa.) has a mixed viscosity of 3,000 (cps). In some instances, it is mixed at a percent by weight range of 25% to 75% with a harder material (such as, Dragon Skin® 10 medium, Smooth-On, Inc., Easton, Pa.) that is more viscous at a mixed viscosity of 23,000 (cps). It is recommended that these materials are mixed at a 1:1 ratio or 50% each.

The subcutaneous layer 310 is the second layer of the abdominal insert 306. Pigments are added to create a realistic appearance matching the human adipose tissue. This layer is made as a blend of three silicone components in some instances. In one embodiment, the first silicone used is a platinum cured silicone thermoset (Silicone 99-255, Smooth-On, Inc., Easton, Pa.) of shore hardness 00-10. The second component is a silicone oil (TC-5005 C, BJB Enterprises, Tustin, Calif.), which could also be substituted for F-100 (SILPAK, Inc., Pomona, Calif.). The last component of the blend is silicone foam (Soma Foama®, Smooth-On, Inc., Easton, Pa.). Percentages by weight composition ranges were tested in order to identify combinations best resembling the appearance and feel of the subcutaneous layer. Suitable tanges include: 40-55%% for Silicone 99-255, 32-40% for the silicone oil and 8-18% for the silicone foam. After testing the percentages by weight compositions, the recommended percentages are: 50% Silicone 99-255, 32% TC-5005 C and 18% Soma Foama®.

The fascia layer 314 is the third layer of the abdominal insert 306 and it is manufactured as a two-level component. The first level consists of a fabric like element. Different pre-manufactured materials can be utilized for this first level, some of these materials include: Tyvek®, Mylar®, Tissue, Ingress Bianco, Organza and Vellum. For the second level a silicone blend of platinum cured silicone thermosets is utilized in some instances due to its ability to interact with surrounding tissue. This silicone based blend needs to attach to the inner walls of the muscle layer in order to properly simulate human anatomy. Moreover, pigments are added to this silicone layer to match the appearance of human fascia. In some instances, the fascia layer 314 is formed of by a combination of TC-5005 C (BJB Enterprises, Tustin, Calif.), Silicone 99-255 (Smooth-On, Inc., Easton, Pa.), Ecoflex® 00-30 (Smooth-On, Inc., Easton, Pa.), and Dragon Skin® 10 medium (Smooth-On, Inc., Easton, Pa.). Percentages by weight compositions used in testing include: 100% Ecoflex® 00-30 and a blend of Dragon Skin® 10 medium (ranging from 50-65%), Ecoflex® 0030 (ranging from 25-30%), and Silicone Oil (ranging from 5-25%). The recommended composition for the fascia layer is 65% Dragon Skin® 10 medium, 25% Ecoflex® 0030 and 10% Silicone oil.

The muscle layer 316 is the fourth layer of the abdominal insert 306. The color of the human muscle is simulated by adding silicone pigment until the desired match is obtained. This layer is made platinum cured silicone thermosets and it is one of the key elements in the support structure of the abdominal insert. A harder material is preferred for this layer; however, it is also important to consider the feel of the material. Thus ranges from 00-30 to 10 A hardness are considered good selections in order to obtain the right balance between hardness and realistic muscle texture. Materials utilized in some embodiments of the muscle layer at different percent compositions include a 100% composition by weight of Ecoflex® 00-30 (Smooth-On, Inc., Easton, Pa.), and a blend of 25%-75% Dragon Skin® 10 medium (Smooth-On, Inc., Easton, Pa.) and 25%-75% Ecoflex® 00-30. The recommended or preferred composition is a 1:1 ratio blend.

The peritoneum layer 320 is the fifth and final layer of the abdominal insert 306. This layer is made using a blend of two platinum cured silicone thermosets in some instances. A combination of Ecoflex® 0030 (Smooth-On, Inc., Easton, Pa.) and Dragon Skin® 10 medium (Smooth-On, Inc., Easton, Pa.) is the preferred mixture for this layer. Different percentage compositions were considered for this blend. Ranges for both silicone components (Ecoflex® 0030 and Dragon Skin® 10 medium) were selected at 25-75% of weight composition. Just as with the skin layer it is important to consider the viscosity of the materials due to the fact that this layer is manufactured by pouring. In addition this layer is extremely thin, measuring only 0.01", in some instances, which adds complexity to the manufacturing process. Taking the mentioned factors into consideration, in some instances the percent by weight of this blend is 50% of Ecoflex® 0030 (Smooth-On, Inc., Easton, Pa.) and 50% of and Dragon Skin® 10 medium (Smooth-On, Inc., Easton, Pa.). Since the natural peritoneum layer in the human body is a clear thin membrane, no pigments are utilized because the silicone components used in this blend are translucent.

Generally, the thicknesses of the various layers of the surgical insert 306 are selected to match the natural human anatomy. Accordingly, in some instances, the layers have thicknesses within the range set forth in Table 2 below and are formed of the corresponding material(s) listed in the table. However, it is understood that numerous other materials and/or ratios of materials are utilized in the surgical insert in other instances to simulate these same layers.

TABLE 2

Exemplary Layer Type, Thickness and Sample Material

| Layer type: | Thickness: | Sample Material Breakdown: |
| --- | --- | --- |
| Skin | 0.04"-0.08" | 50% Dragon Skin ® 10 medium, 50% Ecoflex ® 0030 |
| Adipose | 0.50"-0.75" | 50% Ecoflex ® 0010, 32% Oil, 18% Soma Foama |
| Fascia | 0.04"-0.08" | 65% Dragon Skin ® 10 medium, 25% Ecoflex ®, 10% Oil + Organza |
| Muscle | 0.25"-0.50" | 50% Dragon Skin ® 10 medium, 50% Ecoflex ® 0030 |
| Peritoneum | 0.01"-0.03" | 50% Dragon Skin ® 10 medium. 50% Ecoflex ® 0030 |

Figure 22:
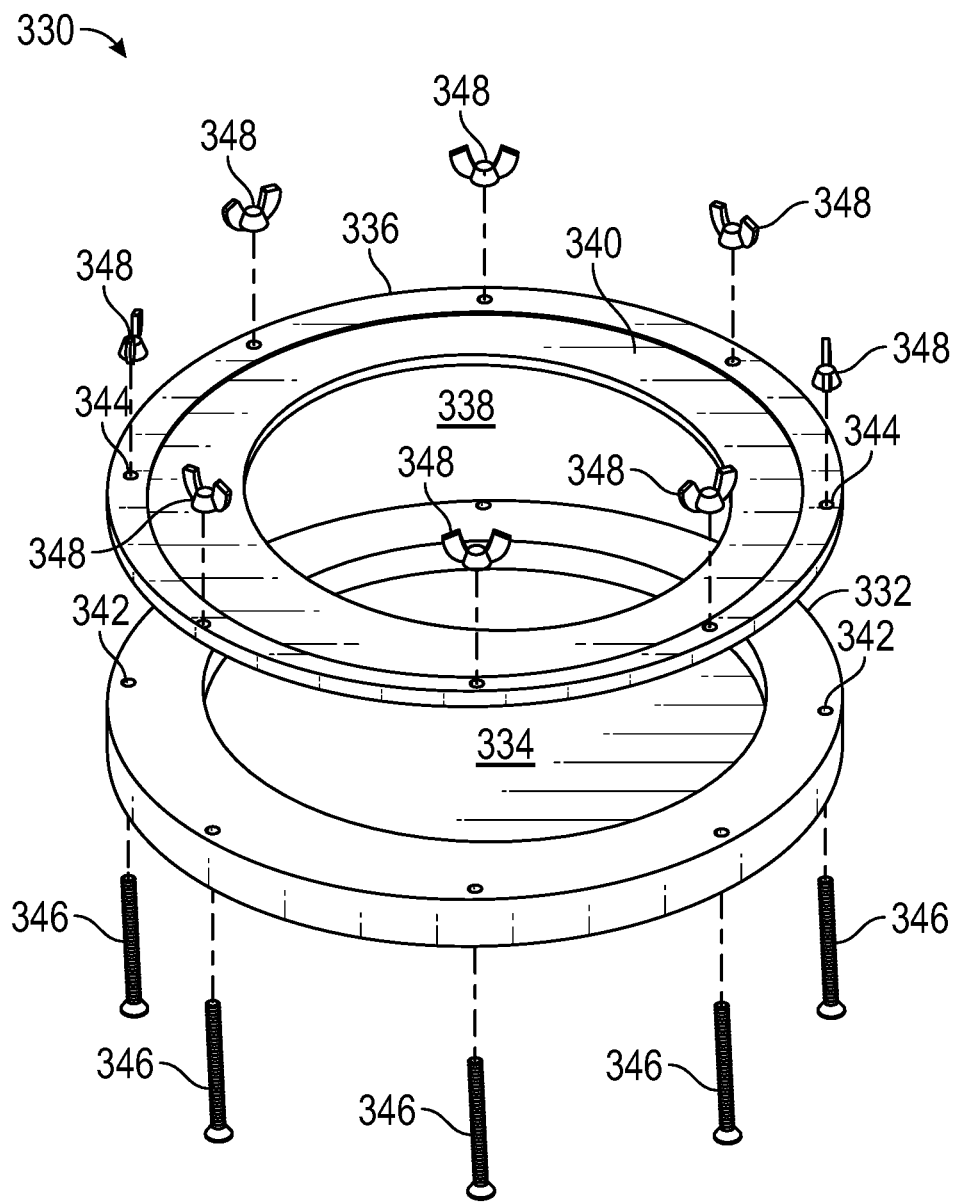
FIG. 22 is a perspective, exploded view of a molding system configured to produce at least a portion of the surgical insert of FIGS. 20 and 21 according to an embodiment of the present disclosure.
Figure 23:
FIG. 23 is a side view of an intermediate stage of manufacture of the surgical insert of FIGS. 20 and 21 according to an embodiment of the present disclosure.

The abdominal wall surgical insert 306 is manufactured in two separate parts using two multi-component molds in some instances. Referring now to FIGS. 22 and 23, the first mold 330, which may be referred to as the superficial tissue mold, is shown therein. As shown, the mold 330 includes a lower component 332 having a cavity 334 and an upper component 336 configured to mate with the lower component. In that regard, the upper component 336 includes a central opening 338 extending therethrough and a lip 340 surrounding the opening 338. The mold 330 is configured to make the skin and subcutaneous layers 308, 310. In that regard, the lip 340 is configured to define the undercut 312 between the skin layer 308 and the subcutaneous layer 310. The bottom component 332 includes openings 342 and the upper component 336 includes openings 344. The openings 342 and 344 are configured to interface with fasteners 346, 348 that secure the upper and lower components 332, 336 together. In that regard, the mold 300 is assembled (i.e., the top and bottom components 332, 336 are secured together with the fasteners 346, 348) before either layer is poured into the mold. Although second in layer order of the resulting insert 306, the material for subcutaneous layer 310 is poured first into the cavity 334 of the bottom component 332 and part of the top component 336. The lip 340 will define a recess or void in the subcutaneous layer 310 that becomes undercut 312. The desire to have undercut 312 is what makes a two part mold desirable in this instance. The de-molding of such a silicone assembly would be very difficult on a single component pouring mold. FIG. 23 illustrates the portion of the insert 306 resulting from mold 330. The mold design as described above requires that the subcutaneous layer of the insert be poured prior to the skin layer. In an alternative embodiment, a three component mold in which the skin layer can be poured prior to the subcutaneous layer is utilized.

Figure 24:
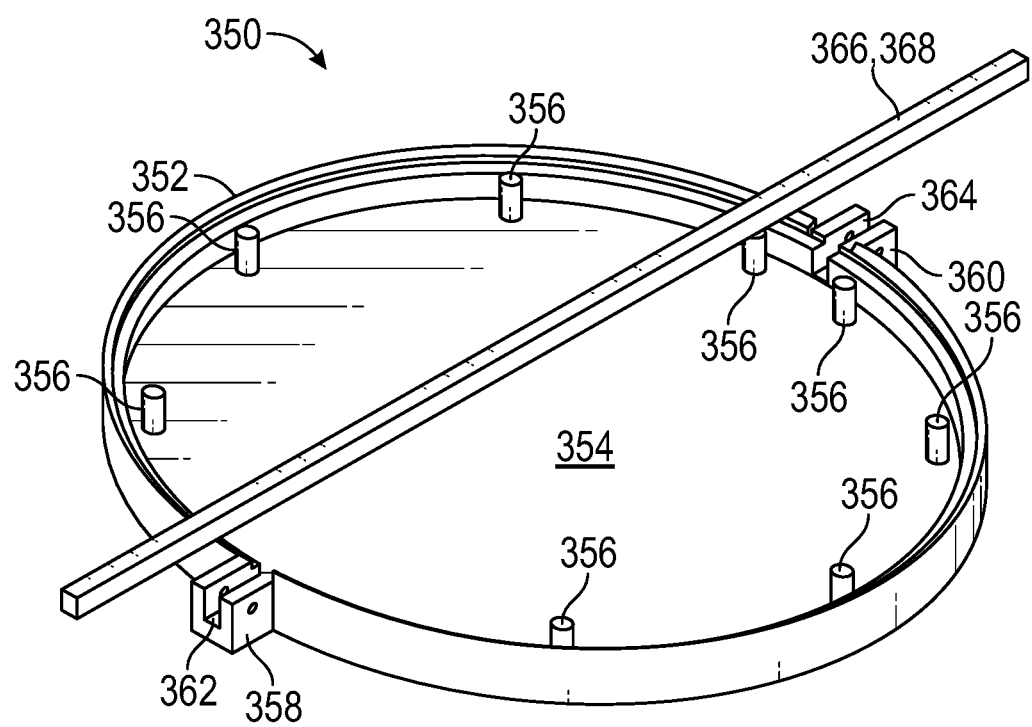
FIG. 24 is a perspective, exploded view of a molding system configured to produce at least a portion of the surgical insert of FIGS. 20 and 21 according to an embodiment of the present disclosure.
Figure 25:
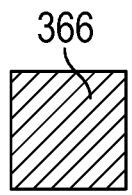
FIGS. 25-30 illustrate a series of manufacturing steps using the molding system of FIG. 24 according to an embodiment of the present disclosure.
Figure 26:
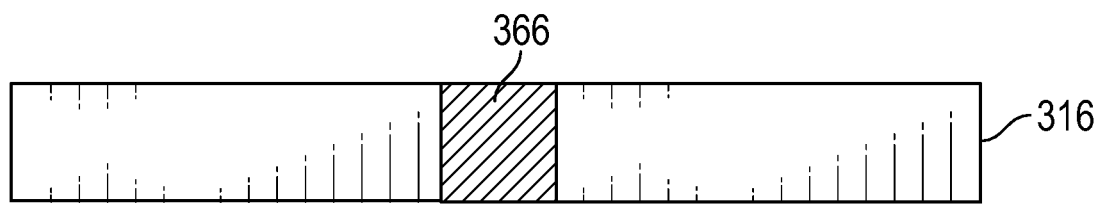
Figure 27:
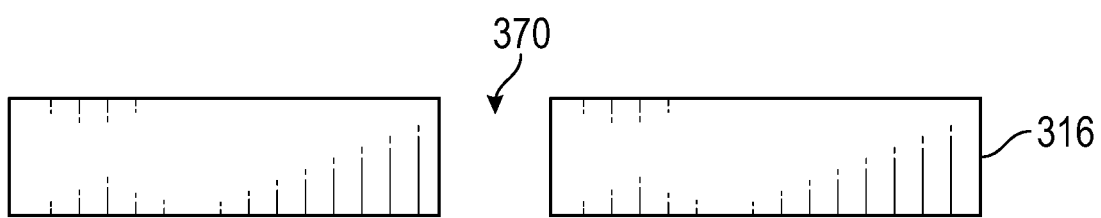
Figure 28:
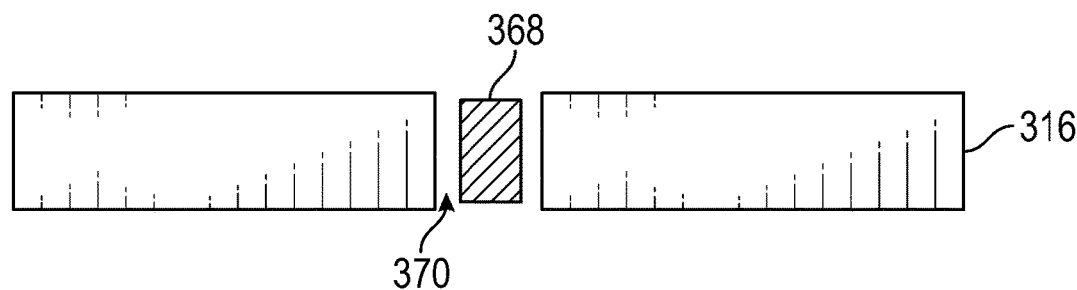
Figure 29:
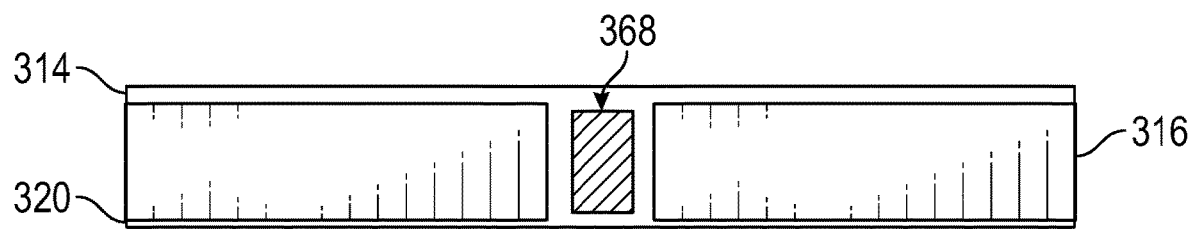
Figure 30:
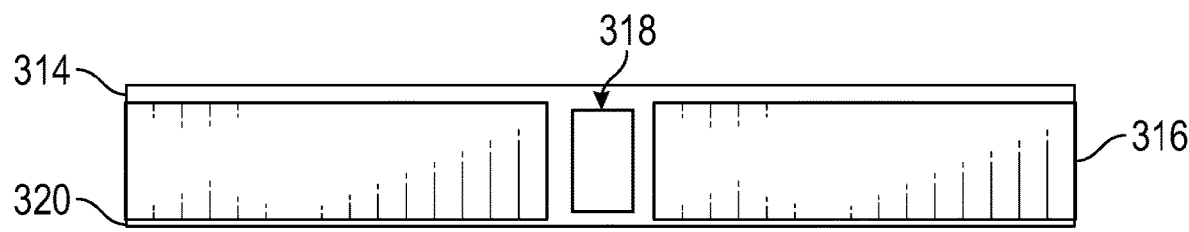
Figure 31:
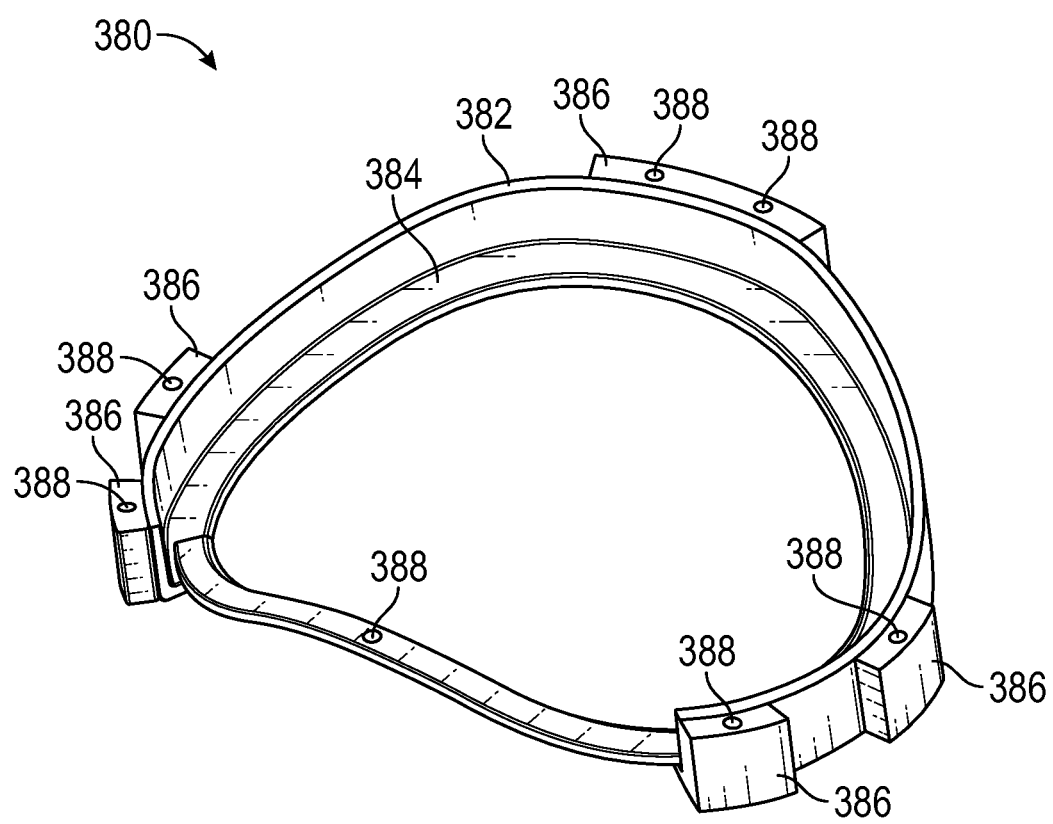
FIG. 31 is a perspective view of a support structure configured for use with a surgical insert according to an embodiment of the present disclosure.

Referring now to FIG. 24, the second mold 350, which may be referred to as the deep tissue mold, is shown therein. As shown, the mold 350 includes a main component 352 that defines a cavity 354. A plurality of projections 356 extend upwards from cavity 354. In the illustrated embodiment the projections 356 are cylindrical. In some instances the projections 356 are utilized to create opening through the fascia, muscle, and peritoneum layers 314, 316, and 320. The most critical part of this second silicone assembly is properly reproducing the inner wall attachment of the fascia layer 314 to the muscle layer 316. In order to achieve this task, the main component 352 includes structures 358 and 360 on opposite sides of the component that define recesses 362 and 364, respectively. The recesses 362, 364 are configured to receive key stock inserts 366, 368. In that regard, the key stock inserts 366, 368 have different sizes and this variation in size is utilized to ensure proper attachment of the fascia 314 to the muscle 316. In one particular arrangement, stock insert 366 has a width of approximately 0.1905", a height of approximately 0.4405", and a length of 12.000", while stock insert 368 has a width of approximately 0.1230", a height of approximately 0.2480", and a length of 12.000". In some instances, the inserts 366, 368 are pre-manufactured zinc-plated steel key stock components of different dimensions. In general, the larger cross-sectional insert 366 is placed first in the recesses 362, 364 of the component 352 before pouring the muscle layer in order to produce the inner walls of the muscle. The smaller cross-sectional insert 368 is then placed in the recesses 362, 364 of the component 352 to allow the fascia layer to attach to the inner walls of the muscle layer 316. FIGS. 25-30 illustrate this process. For simplicity in illustration, the mold component 352 is not illustrated. FIG. 25 shows the insert 366. The muscle layer 316 is then formed around the insert 366, as shown in FIG. 26. The insert 366 is then removed, as shown in FIG. 27, and replaced with insert 368, as shown in FIG. 28. Because the insert 368 has a smaller cross-sectional profile than the insert 366, there is space 370 between the insert 368 and the muscle layer 316. The material for the fascia layer 314 is then introduced and fills the space 370 between the insert 368 and the muscle layer 316, as shown in FIG. 29. The insert 368 is then removed leaving opening 318, as shown in FIG. 30.

The molds 330 and 350 are designed using 3D CAD programs (SolidWorks and Rapidform), and prototypes of these molds are made in ABS for testing. The preferred material for production molds will be Aluminum 6061 due to its heat transfer and light weight properties. However, other suitable mold materials may be utilized.

Figure 32:
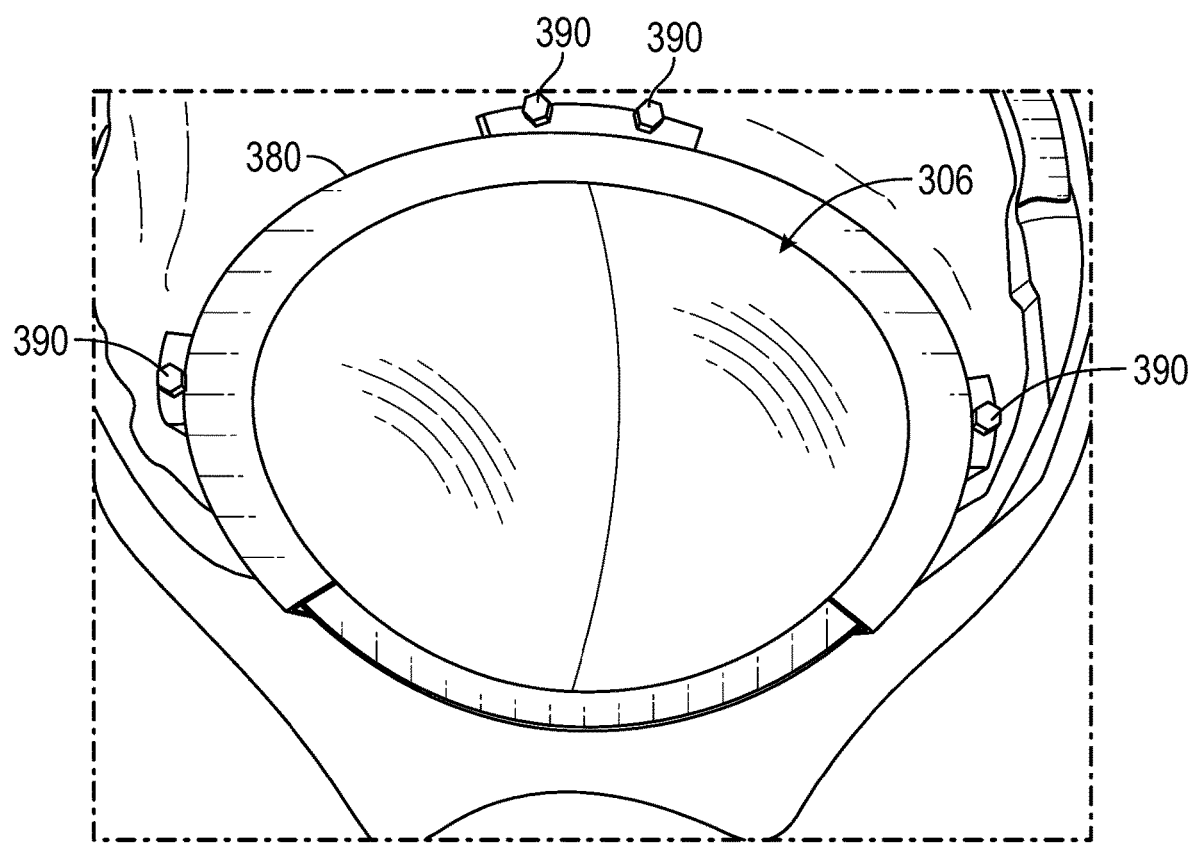
FIG. 32 is a bottom view of the support structure similar to that of FIG. 31 assembled with a surgical insert according to an embodiment of the present disclosure.

One suitable technique for manufacturing an abdominal surgical wall insert according to the present disclosure will now be described. No limitation is intended hereby and those skilled in the art will recognize that many different modifications and/or alternative manufacturing techniques may be utilized, including the use of alternative materials. In one particular embodiment, an abdominal surgical wall insert is manufactured using the following steps:

1. Manufacture of Subcutaneous Layer:
   a) Clean mold and apply petroleum jelly to parts of the mold which will be in contact with this layer
   b) Attach the two parts of the mold (Superficial Tissue Top & Bottom) using counter sunk and butterfly fasteners
   c) Prepare Subcutaneous Mixture (Materials: TC-5005C, Silicone 99-255 and Soma Foama®)
      a. Measure 180 g of TC-5005C, add 140.25 g of Silicone 99-255 Part A, add 67.3 g of Soma Foama® Part A, add 0.2 g of Silc-Pig® Flesh tone pigment, add 4 drops of Silc-Pig® Yellow pigment, and mix until blend is homogenous.
      b. Add 33.7 g of Soma Foama® Part B, add 140.25 g of Silicone 99-255 Part B
      c. Mix for approximately 7 minutes at 72° F. until bubble formation and blend begins to thicken.
   d) Pour mixture into mold and gently mix until blend starts to set
   e) Allow the mixture to cure for approximately 1.5 hours
   f) If foams expands trim as needed
2. Manufacture of Skin Layer:
   a) Clean Superficial Tissue Top part of the mold
   b) Prepare Skin Mixture (Materials: Ecoflex® 0030 and Dragon Skin® 10 Medium)
      a. Measure 36.3 g of Ecoflex® 0030 Part A, add 36.3 g of Dragon Skin® 10 Medium Part A and mix until blend is homogenous
      b. Add 36.3 g of Ecoflex® 0030 Part B, add 36.3 g of Dragon Skin® 10 Medium Part B, add 0.4 g of Silc-Pig® Flesh tone pigment, add 1 drop of FuseFX Rosy Skin, add 2 drops of FuseFX Light Skin and mix until blend is homogeneous.
   c) Place mixture in vacuum until air bubbles are removed
   d) Pour Skin mixture on top of the cured Subcutaneous layer carefully, to prevent material overflow
   e) Remove any additional bubbles created during the pouring of mixture
   f) Allow mixture to cure for approximately 3.5 hours at room temperature.
3. Manufacture of Peritoneum Layer:
   a) Clean mold
   b) Prepare Peritoneum Mixture (Material: Ecoflex® 0030, Dragon Skin® 10 Medium)
      a. Measure 19.0 g of Ecoflex® 0030 Part A, add 19.0 g Dragon Skin® 10 Medium Part A, and mix until blend is homogenous
      b. Add 19.0 g of Ecoflex® 0030 Part B, add 19.0 g Dragon Skin® 10 Medium Part B, and mix until blend is homogeneous
   c) Place mixture in vacuum until air bubbles are removed
   d) Pour blend into the mold and remove any additional bubbles created during the pouring process
   e) Allow mixture to cure for 30 minutes at 66° C.
   f) Clean top surface of layer with isopropanol and apply a substantial amount of mold release
4. Manufacture of Muscle Layer:
   a) Apply petroleum jelly to the first zinc-plated steel key stock insert (Insert A) on all surfaces
   b) Place insert onto mold and in contact with top surface of cured Peritoneum Layer
   c) Prepare Muscle Mixture (Materials: Ecoflex® 0030 and Dragon Skin® 10 Medium)
      a. Measure 87.0 g of Ecoflex® 0030 Part A, add 87.0 g of Dragon Skin® Medium Part A and mix
      b. Add 87.0 g of Ecoflex® 0030 Part B, add 87.0 g of Dragon Skin® Medium, add 0.6 g of Silc-Pig® Blood pigment and mix until mixture becomes homogenous.
   d) Place mixture in vacuum until air bubbles are removed
   e) Pour blend into the mold and remove any additional bubbles created during the pouring process
   f) Allow mixture to cure for 30 minutes at 66° C.
   g) Remove first insert from mold
   h) Clean top surface of layer with isopropanol and apply a substantial amount of mold release
5. Manufacture of Fascia Layer:
   a) Apply petroleum jelly to the second key stock insert (Insert B) on all surfaces
   b) Place insert onto mold and in contact with top surface of cured Peritoneum Layer
   c) Prepare Fascia Mixture (Materials: Ecoflex® 0030, TC-5005C, Dragon Skin® 10 Medium)
      a. Measure 8.25 g of Ecoflex® 0030 Part A, add 7.0 g of TC-5005C, add 21.5 g of Dragon Skin® 10 Medium Part A and mix
      b. Add 8.25 g of Ecoflex® 0030 Part B, add 21.5 g of Dragon Skin® 10 Medium Part B, add 0.2 g of Silc-Pig® White pigment and mix until mixture becomes homogenous
   d) Place mixture in vacuum until air bubbles are removed
   e) Cut second layer of fascia (Material: Organza) to match elliptical pattern
   f) Place second layer fascia (Organza) on top of cured muscle layer
   g) Pour mixture into the mold and remove any additional bubbles created during the pouring process
   h) Allow mixture to cure for 30 minutes at 66° C.
   i) Remove second insert from mold
   j) Clean top surface of cured fascia layer with isopropanol
6. Attachment of Skin & Subcutaneous (part 1) to Fascia, Muscle and Peritoneum (part 2):
   Since the AWSI is manufactured in two separate parts and final assembly of the silicone components is needed
   a) Place Skin & Subcutaneous (part 1) on a flat surface with Subcutaneous layer facing in the upward direction
   b) Clean Subcutaneous layer using isopropanol solution
   c) Place part 2 on a flat surface with the fascia layer facing in the upward direction
   d) Apply a thin coat of Sil-Poxy® silicone adhesive to Fascia layer
   e) Place fascia layer of part 2 in direct contact with Subcutaneous layer of part 1
   f) Allow adhesive to cure for approximately 12 minutes
   g) Gently brush skin layer of AWSI with talc powder Referring now to FIGS. 31 and 32, the abdominal wall surgical insert 306 will include a support member 380 along with fasteners for support and attachment to the tummy cover. The support member 380 is made from any suitable material such as ABS material, Polycarbonate, Polypropylene, and or other suitable materials. As shown, the support member 380 includes an outer wall 382 and a lip 384. A plurality of structures 386 are positioned around the perimeter of the support member 380 and include openings 388 extending therethrough that are configured to receive fasteners. Generally, any type of fastener may be utilized, but in some embodiments a standard 8-32 nylon screws 390 having a length of approximately 1.5" and 8-32 nylon acorn nuts are utilized to secure the support member 380 to the tummy cover, as shown in FIG. 32.

There are many ways of attaching the insert 306 to the vinyl tummy cover. Two options will now be discussed, but no limitation is intended thereby. In a first approach, the tummy cover is placed with pre-made elliptical cavity and screw bosses on a flat surface, with the umbilicus facing downward. The support member 380 is placed in direct contact with interior part of tummy cover. The nylon screws or other fasteners are placed through the screw bosses of the tummy cover and the support. The assembly is then secured together using nylon acorn fasteners. The assembly is then turned over such that the umbilicus is facing upward and the surgical insert is placed through premade cavity in the tummy cover and into engagement with the support. In some embodiments, the undercut 312 of the surgical insert mates with the lip 340 of the support member 380. In the second approach, the tummy cover is placed with pre-made elliptical cavity and screw bosses on a flat surface, with umbilicus facing the down. The surgical insert is then placed with skin overlap facing the downward direction to allow the skin to sit in bellow tummy cover's front surface. The nylon screws or other fasteners are placed through the screw bosses of the tummy cover and surgical insert. The support member is then placed in direct contact with peritoneum layer and through nylon screws. The assembly is then secured together by using nylon butterfly fasteners. In one or more embodiments, including at least the first approach and the second approach described above, when the support member 380 secures the abdominal wall surgical insert 306 within the cavity of the tummy cover 304, the abdominal wall surgical insert 306 is removable from the cavity of the tummy cover 304 without removing or disengaging the support member 380 from the tummy cover 304.

A standard surgical manikin will include the surgical insert 306 attached to the manikin's tummy cover. This type of insert can be used in C-section, laparoscopic and open abdominal procedures. The standard insert is a five layer elliptical insert; however, in special cases such as in OB/GYN surgical procedures an additional layer to simulate the uterus may be added. C-section procedures may require an incision low in the pelvic region such as the Pfannenstiel incision, thus the current location of the abdominal wall cavity and/or the geometry of the insert may be alter to increase the realism of the procedure. In such case, alternate support mechanisms can be put in place outside or within the surgical insert. The addition of elastic straps, or embedded plastic meshes can be used in the event that additional support is needed. This concept will also be applied in the event that the location or geometry of the insert needs to be altered due to the demands of a laparoscopic procedure.

Further, artificial blood can be added to the surgical insert in order to enhance the realism of the surgical experience. The fact that the silicone components used in this insert are hydrophobic in nature, presents an advantage when using water based artificial blood solutions. In that regard, the silicone encases drops of water based artificial blood solution as it cures. Accordingly, in some instances artificial blood drops are added to the uncured subcutaneous layer during manufacture. These blood casings are ruptured by a scalpel during surgery simulations, adding the bleeding component of a standard surgical procedure.

Having a surgical simulator such as those described above offers great advantages over more commonly used surgical learning tools (use of animals and cadavers). The fact that the use of animals and cadavers require special permits and regulations, make the simulated surgical inserts of the present disclosure more accessible and cost effective than their counterparts.

The foregoing outlines features of several embodiments so that those skilled in the art may better understand the aspects of the present disclosure. Those skilled in the art should appreciate that they may readily use the present disclosure as a basis for other devices that simulate natural biological tissue, including human tissue. In particular, the materials and methods of the present disclosure may be readily used in any application where the simulation of human skin, with or without underlying tissue structures, is desired. Such applications include, but are not limited to, manikins, sex toys, puppets, costumes, medical training devices, and/or other devices. Those skilled in the art should also realize that such equivalent constructions do not depart from the spirit and scope of the present disclosure, and that they may make various changes, substitutions, and alterations to the embodiments disclosed herein without departing from the spirit and scope of the present disclosure. Also, it will be fully appreciated that the above-disclosed features and functions, and variations thereof, may be combined into other methods, systems, apparatus, or applications.

What is claimed is:

1. A patient simulator, comprising:
    a torso defining an abdominal opening;
    a tummy cover defining a cavity and configured to be received within the abdominal opening of the torso;
    an abdominal wall surgical insert configured to be received within the cavity of the tummy cover; and
    a support member secured to the tummy cover;
    wherein:
        the support member is configured to secure the abdominal wall surgical insert within the cavity of the tummy cover; and
        when the support member secures the abdominal wall surgical insert within the cavity of the tummy cover, the abdominal wall surgical insert is removable from the cavity of the tummy cover without removing or disassembling the support member.

2. The patient simulator of claim 1, wherein the support member comprises:
    an outer wall; and
    a plurality of structures positioned around a perimeter of the support member, each of the plurality of structures having an opening formed therein, said openings each receiving a fastener to secure the support member to the tummy cover.

3. The patient simulator of claim 1, wherein the support member comprises a lip;
    wherein the abdominal wall surgical insert comprises a recess configured to mate with the lip of the support member to secure the abdominal wall surgical insert within cavity of the tummy cover.

4. A patient simulator, comprising:
    a torso defining an abdominal opening;
    a tummy cover defining a cavity and configured to be received within the abdominal opening of the torso;

an abdominal wall surgical insert configured to be received within the cavity of the tummy cover; and a support member configured to secure the abdominal wall surgical insert within the cavity of the tummy cover;

wherein the support member comprises a lip;

wherein the abdominal wall surgical insert comprises a recess configured to mate with the lip of the support member to secure the abdominal wall surgical insert within the cavity of the tummy cover;

wherein the abdominal wall surgical insert comprises:
a skin layer defining an outer surface of the abdominal wall surgical insert; and
a subcutaneous layer positioned beneath the skin layer; and wherein the recess is formed in the subcutaneous layer adjacent the skin layer.

5. The patient simulator of claim 1, wherein the abdominal wall surgical insert comprises a skin layer defining an outer surface of the abdominal wall surgical insert.

6. The patient simulator of claim 5, wherein the abdominal wall surgical insert further comprises a subcutaneous layer positioned beneath the skin layer.

7. The patient simulator of claim 6, wherein the abdominal wall surgical insert further comprises a fascia layer positioned beneath the subcutaneous layer.

8. The patient simulator of claim 7, wherein a silicon adhesive fixedly secures the fascia layer to the subcutaneous layer.

9. The patient simulator of claim 7, wherein the fascia layer comprises a fabric-like element.

10. The patient simulator of claim 7, wherein the abdominal wall surgical insert further comprises a muscle layer positioned beneath the fascia layer.

11. The patient simulator of claim 10, wherein an opening extends through a central portion of the muscle layer.

12. The patient simulator of claim 10, wherein the abdominal wall surgical insert further comprises a peritoneum layer positioned beneath the muscle layer.

13. The patient simulator of claim 12, wherein the peritoneum layer measured equal to or less than 0.01" thick.

14. An abdominal wall surgical insert, comprising:
a skin layer defining an outer surface of the abdominal wall surgical insert;
a subcutaneous layer positioned beneath the skin layer;
a fascia layer positioned beneath the subcutaneous layer;
a muscle layer positioned beneath the fascia layer;
a peritoneum layer positioned beneath the muscle layer; and
a recess configured to mate with a lip to secure the abdominal wall surgical insert within an abdominal opening of a torso of a patient simulator;
wherein the recess is formed in the subcutaneous layer adjacent the skin layer.

15. The abdominal wall surgical insert of claim 14, wherein a silicon adhesive fixedly secures the fascia layer to the subcutaneous layer.

16. The abdominal wall surgical insert of claim 14, wherein the fascia layer comprises a fabric-like element.

17. The abdominal wall surgical insert of claim 14, wherein an opening extends through a central portion of the muscle layer.

18. The abdominal wall surgical insert of claim 14, wherein the peritoneum layer is equal to or less than 0.01" thick.

* * * * *